(12) United States Patent
Furuta

(10) Patent No.: US 11,884,120 B2
(45) Date of Patent: Jan. 30, 2024

(54) VIBRATION DAMPING CONTROL APPARATUS

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 350 days.

(21) Appl. No.: 17/468,153

(22) Filed: Sep. 7, 2021

(65) Prior Publication Data

US 2022/0111695 A1    Apr. 14, 2022

(30) Foreign Application Priority Data

Oct. 14, 2020    (JP) .................... 2020-172940

(51) Int. Cl.
*B60G 17/0165*    (2006.01)
*B60G 17/018*    (2006.01)

(52) U.S. Cl.
CPC ....... *B60G 17/0165* (2013.01); *B60G 17/018* (2013.01); *B60G 2400/204* (2013.01); *B60G 2400/252* (2013.01); *B60G 2400/821* (2013.01); *B60G 2500/10* (2013.01); *B60G 2600/60* (2013.01)

(58) Field of Classification Search
CPC .............. B60G 17/0165; B60G 17/018; B60G 2400/204; B60G 2400/252; B60G 2400/821; B60G 2500/10; B60G 2600/60; B60G 2202/40; B60G 2400/102; B60G 2400/82; B60G 2401/16; B60G 2600/182; B60G 17/06
See application file for complete search history.

(56) References Cited

U.S. PATENT DOCUMENTS

| | | | | |
|---|---|---|---|---|
| 8,296,009 | B2 * | 10/2012 | Kajino | B60G 17/0165 701/37 |
| 9,963,006 | B2 * | 5/2018 | Kubota | B60G 17/0165 |
| 2002/0045977 | A1 * | 4/2002 | Uchiyama | B60G 17/01908 280/5.515 |
| 2003/0033063 | A1 * | 2/2003 | Kawashima | B60G 13/14 701/37 |
| 2010/0204885 | A1 * | 8/2010 | Kajino | B60G 21/0555 701/37 |
| 2015/0046035 | A1 * | 2/2015 | Kikuchi | B60G 17/0195 701/37 |
| 2017/0274724 | A1 * | 9/2017 | Liu | B60G 17/01933 |
| 2018/0015801 | A1 * | 1/2018 | Mohamed | H04L 67/12 |
| 2018/0154723 | A1 | 6/2018 | Anderson et al. | |
| 2019/0079539 | A1 | 3/2019 | Sridhar et al. | |

* cited by examiner

*Primary Examiner* — Kurt Philip Liethen
(74) *Attorney, Agent, or Firm* — Sughrue Mion, PLLC

(57) ABSTRACT

A vibration damping control apparatus of a vehicle executes preview vibration damping control for controlling a control force generating apparatus on the basis of a final target control force including a first target control force computed by using preview information. When the vibration damping control apparatus determines that the probability that a road surface condition has changed after a past point in time is high, the vibration damping control apparatus executes particular control for setting the magnitude of the first target control force to become smaller.

9 Claims, 14 Drawing Sheets

| SECOND POSITION INFORMATION (X, Y) | SPEED | SECOND ROAD SURFACE DISPLACEMENT RELATED VALUE (UNSPRUNG DISPLACEMENT $z_1\_b$) |
|---|---|---|
| (X1,Y1) | Vs1 | $z_1\_b1$ |
|  | Vs2 | $z_1\_b2$ |
|  | ... | ... |
| (X2,Y2) | Vs1 | $z_1\_b3$ |
|  | Vs2 | $z_1\_b4$ |
|  | ... | ... |
| ... | ... | ... |

FIG.14

VIBRATION DAMPING CONTROL APPARATUS

BACKGROUND OF THE INVENTION

Field of the Invention

The present disclosure relates to a vibration damping control apparatus for a vehicle.

Description of the Related Art

Conventionally, there has been proposed an apparatus (hereinafter referred to as the "conventional apparatus") which controls actuators provided for wheels of a vehicle by using a piece of information relating to the vertical displacement of a road surface that the wheels of the vehicle are predicted to pass (road surface displacement), thereby performing control for suppressing vibrations of a sprung portion of the vehicle (see, for example, US Patent Application Publication No. 2018/154723). Such control is also called "preview vibration damping control."

The conventional apparatus includes a road map database which stores information regarding the surface condition of a road (for example, road surface displacement). The conventional apparatus executes the preview vibration damping control by using the information stored in the road map database.

Incidentally, due to roadwork performed on a road or changes of the road with time, the surface condition of the road (hereinafter referred as the "road surface condition") may change in a certain road section. In such a case, a discrepancy arises between the current road surface condition of the certain road section and the past road surface condition (road surface displacement) of the certain road section contained in the information stored in the road map database. Accordingly, in the case where the preview vibration damping control is executed in a vehicle through use of the information of the road map database while the vehicle is traveling in the certain road section, there may arise a situation where an actuator generates a control force in a direction opposite the direction in which the control force must be generated so as to cancel out the current road surface displacement. Accordingly, there is a possibility that the vibration of the sprung portion of the vehicle increases.

SUMMARY OF THE INVENTION

The present disclosure provides a technique for determining whether or not the road surface condition has changed and changing the control force in the preview vibration damping control in accordance with the result of the determination.

The present disclosure provides a vibration damping control apparatus for a vehicle (10). The vibration damping control apparatus comprises a control force generating apparatus (17), a control unit (30), and an information obtaining apparatus (34, 35, 36, 30).

The control force generating apparatus is configured to generate control force in a vertical direction for damping vibration of a sprung portion of the vehicle, the control force being applied between at least one wheel and a portion of a body of the vehicle, which portion corresponds to a position of the wheel.

The control unit obtains measurement data (42a) in which a road surface displacement related value obtained when a measurement vehicle traveled on a road surface and relating to displacement of the road surface in the vertical direction is related to position information representing a position where the road surface displacement related value was obtained. The control unit determines a predicted passage position that the wheel is predicted to pass after elapse of a predetermined time from the present point in time. The control unit obtains, as preview information, the road surface displacement related value at the predicted passage position on the basis of the measurement data. The control unit executes preview vibration damping control for controlling the control force generating apparatus in such a manner that, at a point in time when the wheel passes the predicted passage position, the control force coincides with a final target control force (Fct) including a first target control force computed by using the preview information.

The information obtaining apparatus is configured to obtain the road surface displacement related value while the vehicle is traveling.

The control unit is configured
  to obtain, from the information obtaining apparatus, as a first value ($z_1\_c$), the road surface displacement related value at a passage position that the wheel of the vehicle has passed at the present point in time,
  to obtain, as a second value ($z_1\_b$), the road surface displacement related value at the passage position on the basis of the measurement data,
  to determine whether or not a first condition is satisfied by using the first value and the second value, the first condition being satisfied when a probability that a road surface condition at the passage position has changed after creation of the measurement data is high, and
  to execute a particular control, when the control unit determines that the first condition is satisfied, so as to set the magnitude of the first target control force to be smaller as compared with the case where the first condition is not satisfied.

For example, it is assumed that the vehicle travels in a road section where the road surface condition had changed greatly after creation of the measurement data. In this case, the vibration damping control apparatus determines that the first condition is satisfied and executes the particular control. As a result, the magnitude of the first target control force becomes smaller. Since the control force generated by the control force generating apparatus becomes smaller, it is possible to reduce the possibility that the vibration of the sprung portion increases.

The control unit may be configured to determine whether or not the first condition is satisfied on the basis of at least one of a difference (Dz1, Dz2) between the first value and the second value and a time series change of the difference.

The control unit may be configured to determine, after having started the particular control, whether or not a second condition is satisfied by using the first value and the second value, the second condition being satisfied when a probability that the road surface condition at the passage position has not changed after creation of the measurement data is high, and to end the particular control when the second condition is satisfied.

For example, when the vehicle leaves the above-described road section after the particular control has been started, the vibration damping control apparatus determines that the second condition is satisfied and ends the particular control. The vibration damping control apparatus executes the preview vibration damping control without changing the magnitude of the first target control force. As a result, the vibration of the sprung portion can be suppressed.

The control unit may be configured to determine whether or not the second condition is satisfied on the basis of at least one of a difference (Dz1, Dz2) between the first value and the second value and a time series change of the difference.

The measurement data may include first data (43) in which the road surface displacement related value (43a) used as the preview information is related to the position information (43b), and second data (44) in which the road surface displacement related value (44a) used as the second value is related to the position information (44b).

The road surface displacement related value of the second data may be a value computed through a filter process which allows passage of only components in a particular frequency band. In this case, the control unit may be configured to execute the filter process on the first value.

Due to the filter process, both the road surface displacement related value (namely, the second value) of the second data and the first value have phase shifts. However, since the first value and the second value are values computed through filter processes identical with each other (for example, filter processes having the same filter characteristics), the degree of phase shift of the first value and the degree of phase shift of the second value coincide with each other. Accordingly, the phase of the first value and the phase of the second value coincide with each other. The vibration damping control apparatus can determine whether or not the first condition is satisfied by using the first value and the second value whose phases coincide with each other. Therefore, the vibration damping control apparatus can accurately determine, through estimation, whether or not the road surface condition has changed after creation of the measurement data.

In the second data, speed information (45b) representing speed of the measurement vehicle or a speed range in which the speed of the measurement vehicle is contained may be further related to the road surface displacement related value (45c) and the position information (45a). In this case, the control unit may be configured to obtain, from the second data, as the second value, the road surface displacement related value related to the speed information corresponding to the speed of the vehicle.

In the second data, the road surface displacement related value is managed on a speed information by speed information basis. From the second data, the vibration damping control apparatus can obtain, as the second value, the road surface displacement related value suitable for the current speed of the vehicle. Accordingly, the vibration damping control apparatus can accurately determine, through estimation, whether or not the road surface condition has changed after creation of the measurement data.

The final target control force may further include a second target control force. The second target control force includes at least one of feedback control force (F2_b) for damping vibration of the sprung portion and control force (F2_a, F2_c) computed by using the road surface displacement related value obtained by the information obtaining apparatus and representing displacement of the road surface ahead of the wheel of the vehicle. In this case, the control unit may be configured to set the magnitude of the second target control force in the particular control such that the magnitude of the second target control force becomes larger as compared with the case where the first condition is not satisfied.

By virtue of the above-described configuration, in a period during which the vibration damping control apparatus is executing the particular control, the vibration damping control apparatus can suppress the vibration of the sprung portion by increasing the magnitude of the second target control force.

The road surface displacement related value may include at least one of road surface displacement ($z_0$) representing displacement of the road surface in the vertical direction, road surface displacement speed ($dz_0$) representing a derivative value of the road surface displacement with respect to time, unsprung displacement ($z_1$) representing displacement of an unsprung portion of the vehicle in the vertical direction, and unsprung speed ($dz_1$) representing a derivative value of the unsprung displacement with respect to time.

The control unit may be realized by a microprocessor programed in order to execute one or more functions described in the present specification. The control unit may be entirely or partially realized by hardware composed of, for example, ASIC; i.e., an integrated circuit dedicated to one or more applications.

In the above description, constituent elements corresponding to those of embodiments which will be described later are accompanied by parenthesized names and/or symbols which are used in the embodiments; however, the constituent elements are not limited to those in the embodiments defined by the names and/or the symbols. Other objects, other features, and attendant advantages of the present disclosure will be readily appreciated from the following description of the embodiments which is made with reference to the accompanying drawings.

BRIEF DESCRIPTION OF THE DRAWINGS

FIG. 14 shows a modification of second data.

DESCRIPTION OF THE PREFERRED EMBODIMENTS (Configuration of Vibration Damping Control Apparatus)

Figure 1:
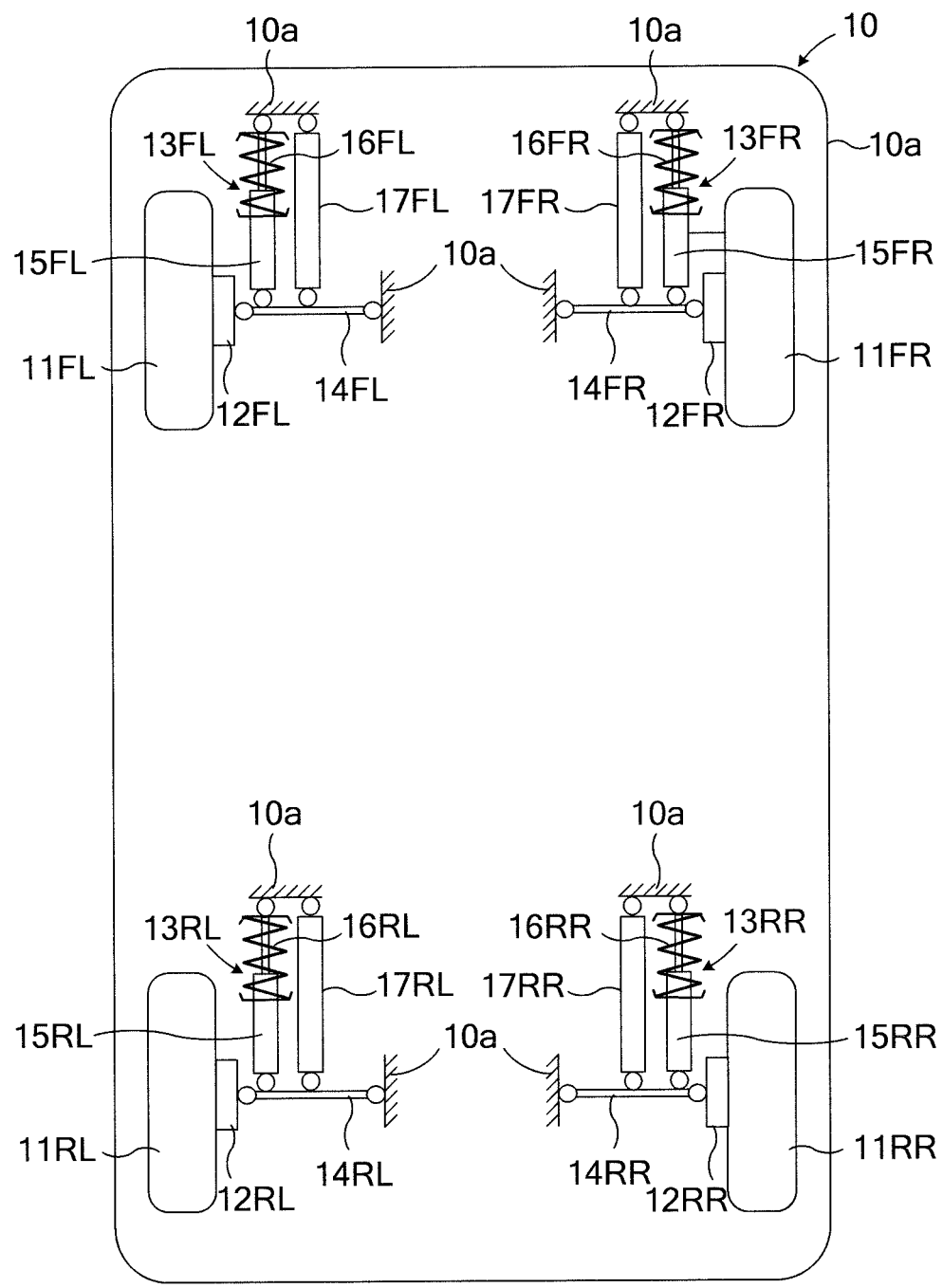
FIG. 1 is a schematic diagram of a vehicle to which a vibration damping control apparatus according to an embodiment is applied.
Figure 2:
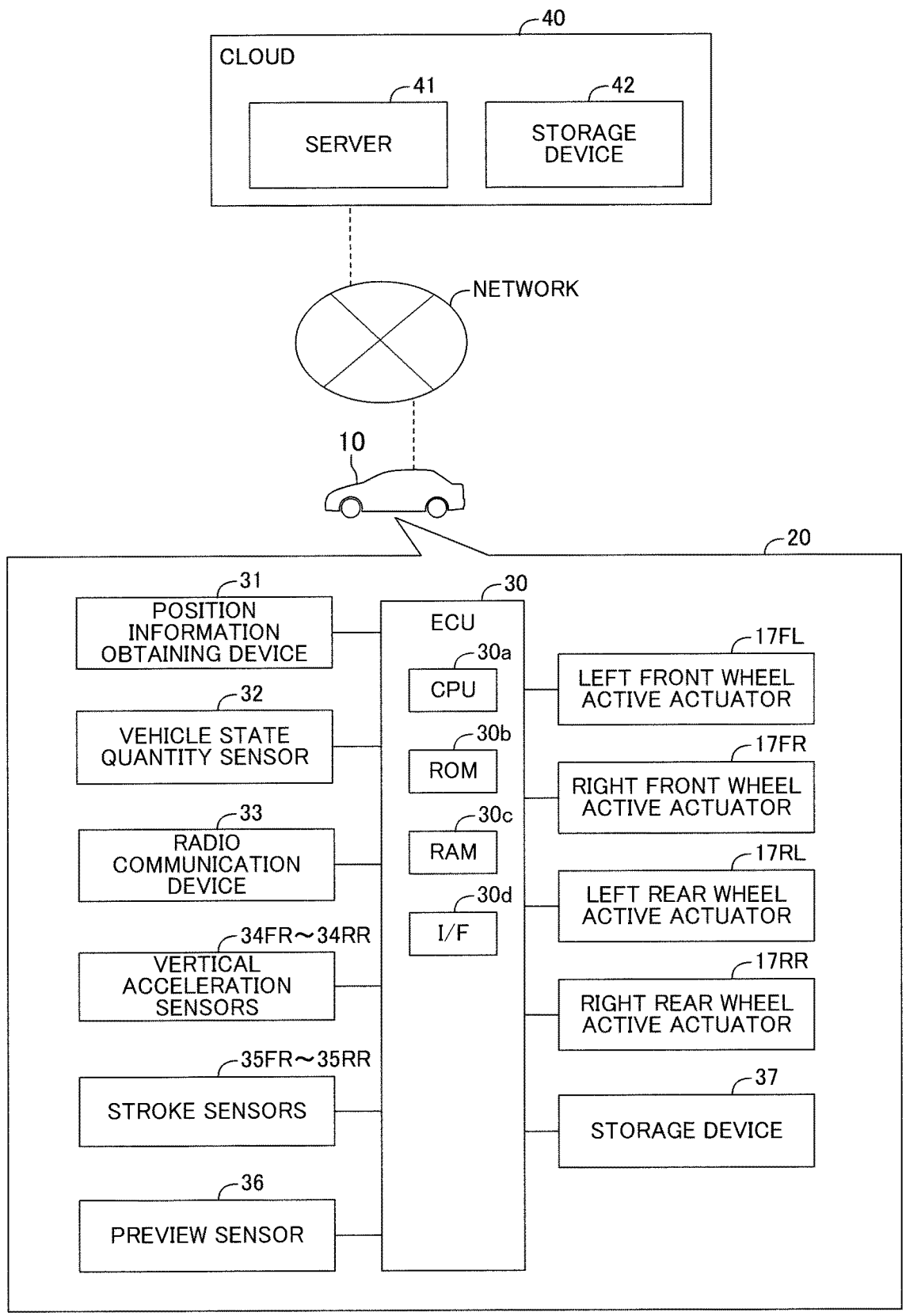
FIG. 2 is a schematic diagram of the vibration damping control apparatus according to the embodiment.

A vibration damping control apparatus according to an embodiment is applied to a vehicle 10 shown in FIG. 1. As shown in FIG. 2, hereinafter, this vibration damping control apparatus is referred to also as the "vibration damping control apparatus 20."

As shown in FIG. 1, the vehicle 10 includes a left front wheel 11FL, a right front wheel 11FR, a left rear wheel 11RL, and a right rear wheel 11RR. The left front wheel 11FL is rotatably supported by a body 10a via a wheel support member 12FL. The right front wheel 11FR is rotatably supported by the body 10a via a wheel support member 12FR. The left rear wheel 11RL is rotatably supported by the body 10a via a wheel support member 12RL. The right rear wheel 11RR is rotatably supported by the body 10a via a wheel support member 12RR.

Notably, the left front wheel 11FL, the right front wheel 11FR, the left rear wheel 11RL, and the right rear wheel 11RR will be referred to as the "wheel(s) 11" in the case where these wheels are not required to be distinguished from one another. Similarly, the left front wheel 11FL and the right front wheel 11FR will be referred to as the "front wheel(s) 11F." Similarly, the left rear wheel 11RL and the right rear wheel 11RR will be referred to as the "rear wheel(s) 11R." The wheel support members 12FL to 12RR will be referred to as the "wheel support member(s) 12."

The vehicle 10 further includes a left front wheel suspension 13FL, a right front wheel suspension 13FR, a left rear wheel suspension 13RL, and a right rear wheel suspension 13RR. These suspensions 13FL to 13RR will now be described in detail. These suspensions 13FL to 13RR are independent-type suspensions. However, the suspensions 13FL to 13RR may be suspensions of a different type.

The left front wheel suspension 13FL suspends the left front wheel 11FL from the body 10a and includes a suspension arm 14FL, a shock absorber 15FL, and a suspension spring 16FL. The right front wheel suspension 13FR suspends the right front wheel 11FR from the body 10a and includes a suspension arm 14FR, a shock absorber 15FR, and a suspension spring 16FR.

The left rear wheel suspension 13RL suspends the left rear wheel 11RL from the body 10a and includes a suspension arm 14RL, a shock absorber 15RL, and a suspension spring 16RL. The right rear wheel suspension 13RR suspends the right rear wheel 11RR from the body 10a and includes a suspension arm 14RR, a shock absorber 15RR, and a suspension spring 16RR.

Notably, the left front wheel suspension 13FL, the right front wheel suspension 13FR, the left rear wheel suspension 13RL, and the right rear wheel suspension 13RR will be referred to as the "suspension(s) 13" in the case where these suspensions are not required to be distinguished from one another. Similarly, the suspension arms 14FL to 14RR will be referred to as the "suspension arm(s) 14." Similarly, the shock absorbers 15FL to 15RR will be referred to as the "shock absorber(s) 15." Similarly, the suspension springs 16FL to 16RR will be referred to as the "suspension spring(s) 16."

The suspension arm 14 connects the wheel support member 12 to the body 10a. In FIG. 1, a single suspension arm 14 is provided for each suspension 13. In a different example, a plurality of suspension arms 14 may be provided for each suspension 13.

The shock absorber 15 is disposed between the body 10a and the suspension arm 14. The upper end of the shock absorber 15 is connected to the body 10a, and the lower end of the shock absorber 15 is connected to the suspension arm 14. The suspension spring 16 is disposed between the body 10a and the suspension arm 14 via the shock absorber 15. Namely, the upper end of the suspension spring 16 is connected to the body 10a, and the lower end of the suspension spring 16 is connected to the cylinder of the shock absorber 15. Notably, in the case where the suspension spring 16 and the shock absorber 15 are disposed in series as described above, the upper end of the shock absorber 15 may be connected to the body 10a, and the lower end of the shock absorber 15 may be connected to the wheel support member 12.

In the present example, the shock absorber 15 is of a damping force fixed type. In a different example, the shock absorber 15 may be of a damping force adjustable type. Furthermore, the suspension spring 16 may be provided between the body 10a and the suspension arm 14 without intermediation of the shock absorber 15. Specifically, the upper end of the suspension spring 16 may be connected to the body 10a, and the lower end of the suspension spring 16 may be connected to the suspension arm 14. Notably, in the case where the suspension spring 16 and the shock absorber 15 are disposed in parallel as described above, the suspension spring 16 and the shock absorber 15 may be disposed in parallel between the body 10a and the wheel support member 12.

Figure 4:
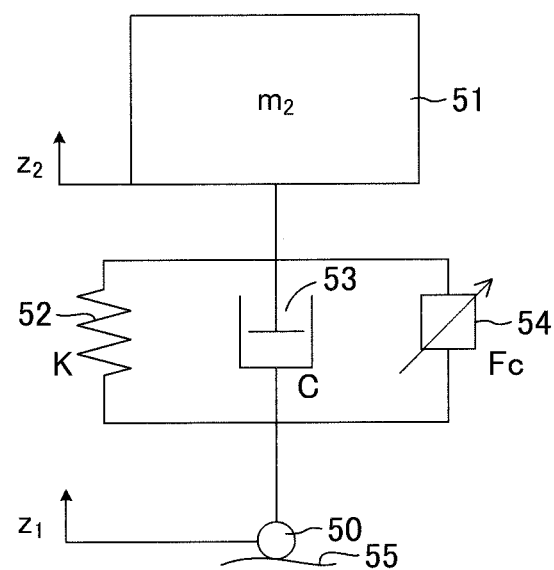
FIG. 4 is a view showing a single wheel model of the vehicle.

Of members including the wheel 11, the shock absorber 15, etc., portions located on the wheel 11 side of the suspension spring 16 will be collectively referred to as an "unsprung portion 50" or an "unsprung member 50" (see FIG. 4). On the other hand, of the members including the body 10a, the shock absorber 15, etc., portions located on the body 10a side of the suspension spring 16 will be collectively referred to as a "sprung portion 51" or a "sprung member 51" (see FIG. 4).

Furthermore, a left front wheel active actuator 17FL, a right front wheel active actuator 17FR, a left rear wheel active actuator 17RL, and a right rear wheel active actuator 17RR are provided between the body 10a and the suspension arms 14FL to 14RR, respectively. These active actuators 17FL to 17RR are disposed in parallel with the shock absorbers 15FL to 15RR and the suspension springs 16FL to 16RR, respectively.

Notably, the left front wheel active actuator 17FL, the right front wheel active actuator 17FR, the left rear wheel active actuator 17RL, and the right rear wheel active actuator 17RR will be referred to as the "active actuator(s) 17" in the case where these active actuators are not required to be distinguished from one another. Similarly, the left front wheel active actuator 17FL and the right front wheel active actuator 17FR will be referred to as the "front wheel active actuator(s) 17F." Similarly, the left rear wheel active actuator 17RL and the right rear wheel active actuator 17RR will be referred to as the "rear wheel active actuator(s) 17R."

The active actuator 17 generates a control force Fc on the basis of a control instruction from an electronic controller 30 shown in FIG. 2. The control force Fc is a force in the vertical direction which acts between the body 10a and the wheel 11 (namely, between the sprung portion 51 and the unsprung portion 50) so as to damp vibrations of the sprung portion 51. Notably, the electronic controller 30 will be referred to as the "ECU 30" and may be referred to as the "control unit" or the "controller." Furthermore, the active actuator 17 may be referred to as the "control force generating apparatus." The active actuator 17 is an electromagnetic active actuator. The active actuator 17 constitutes an active suspension in cooperation with the shock absorber 15, the suspension spring 16, etc.

As shown in FIG. 2, the vibration damping control apparatus 20 includes the above-mentioned ECU 30, a position information obtaining device 31, a vehicle state quantity sensor 32, a radio communication device 33, vertical acceleration sensors 34FL to 34RR, stroke sensors 35FL to 35RR, a preview sensor 36, and a storage device 37. Furthermore, the vibration damping control apparatus 20 includes the above-described active actuators 17FL to 17RR.

The ECU 30 includes a microcomputer. The microcomputer includes a CPU 30a, a ROM 30b, a RAM 30c, an interface (I/F) 30d, etc. The CPU 30a realizes various functions by executing instructions (programs, routines) stored in the ROM 30b.

The ECU 30 is connected to the storage device 37 into which information can be written and from which information can be read. In the present example, the storage device 37 is a hard disk drive. The ECU 30 can store information in the storage device 37 and can read out the information stored in the storage device 37. Notably, the storage device 37 is not limited to the hard disk drive and may be a well known storage device or storage medium into which information can be written and from which information can be read.

The ECU 30 is connected to the position information obtaining device 31, the vehicle state quantity sensor 32, and the radio communication device 33.

The position information obtaining device 31 includes a GNSS (Global Navigation Satellite System) receiver and a map database. The GNSS receiver receives from satellites signals (for example, GNSS signals) for detecting the position of the vehicle 10. The map database stores map information. The position information obtaining device 31 determines the current position (for example, latitude and longitude) of the vehicle 10 on the basis of the GNSS signals and outputs a signal representing the determined position. The position information obtaining device 31 is, for example, a navigation device.

The GNSS signals contain information regarding moving speed. Accordingly, the ECU 30 obtains the vehicle speed Vs of the vehicle 10 at the present point in time on the basis of the GNSS signals. Furthermore, the ECU 30 obtains the heading direction Td of the vehicle 10 on the basis of the record of the position of the vehicle 10 obtained by the position information obtaining device 31.

The vehicle state quantity sensor 32 includes a plurality of types of sensors for detecting the condition of the vehicle 10 (the speed, acceleration, direction, etc. of the vehicle 10). The vehicle state quantity sensor 32 includes a plurality of wheel speed sensors for detecting the wheel speeds of the wheels 11, a longitudinal acceleration sensor for detecting the acceleration of the vehicle 10 in the longitudinal direction, a lateral acceleration sensor for detecting the acceleration of the vehicle 10 in the lateral direction, a yaw rate sensor for detecting the yaw rate of the vehicle 10. Notably, the ECU 30 may compute the vehicle speed Vs on the basis of signals from the wheel speed sensors.

The radio communication device 33 is a radio communication terminal which communicates with a cloud (data management apparatus) 40 through a network for information transfer therebetween. The cloud 40 includes a server 41 and at least one storage device 42, which are connected to the network.

Furthermore, the ECU 30 is connected to the vertical acceleration sensors 34FL to 34RR, the stroke sensors 35FL to 35RR, and a preview sensor 36 and receives signals output from these sensors.

The vertical acceleration sensors 34FL to 34RR detect vertical accelerations (sprung accelerations $ddz_2FL$ to $ddz_2RR$) of the body 10a (the sprung portion 51) at the positions of the wheels 11FL to 11RR and output signals representing the vertical accelerations. Notably, the vertical acceleration sensors 34FL to 34RR will be referred to as the "vertical acceleration sensor(s) 34" in the case where they are not required to be distinguished from one another. Similarly, the sprung accelerations $ddz_2FL$ to $ddz_2RR$ will be referred to as the "sprung acceleration(s) $ddz_2$."

The stroke sensors 35FL to 35RR are provided for the suspensions 13FL to 13RR, respectively. The stroke sensors 35FL to 35RR respectively detect the vertical strokes Hfl to Hrr of the suspensions 13FL to 13RR and output signals representing the vertical strokes. The strokes Hfl to Hrr are vertical strokes of the wheel support members 12FL to 12RR (unsprung portion 50) in relation to the body 10a (the sprung portion 51) at the positions of the wheels 11 shown in FIG. 1. Notably, the stroke sensors 35FL to 35RR will be referred to as the "stroke sensor(s) 35" in the case where they are not required to be distinguished from one another. Similarly, the strokes Hfl to Hrr will be referred to as the "stroke(s) H."

The preview sensor 36 is, for example, one of a camera sensor, a LiDAR, and a radar sensor, or a combination thereof. The preview sensor 36 obtains a value representing the displacement of a road surface in the vertical direction ahead of the vehicle 10 (namely, road surface displacement $z_0$, which will be described later).

The ECU 30, the vertical acceleration sensors 34, the stroke sensors 35, and the preview sensor 36 are components for obtaining a road surface displacement related value, which is a value relating to the displacement of the road surface in the vertical direction, and may be referred to as the "information obtaining apparatus for obtaining the road surface displacement related value" in some cases.

Notably, in the present specification, the road surface displacement related value contains at least one of road surface displacement $z_0$ representing the displacement of the road surface in the vertical direction, road surface displacement speed $dz_0$ representing the derivative value of the road surface displacement $z_0$ with respect to time, unsprung displacement $z_1$ representing the displacement of the unsprung portion 50 in the vertical direction, and unsprung speed $dz_1$ representing the derivative value of the unsprung displacement $z_1$ with respect to time.

The server 41 includes a CPU, a ROM, a RAM, an interface (I/F), etc. The server 41 searches and reads data stored in the storage device 42 and writes data into the storage device 42. Furthermore, in response to a request from the vehicle 10, the server 41 provides the data stored in the storage device 42 to the vehicle 10 via the network.

Figure 3:
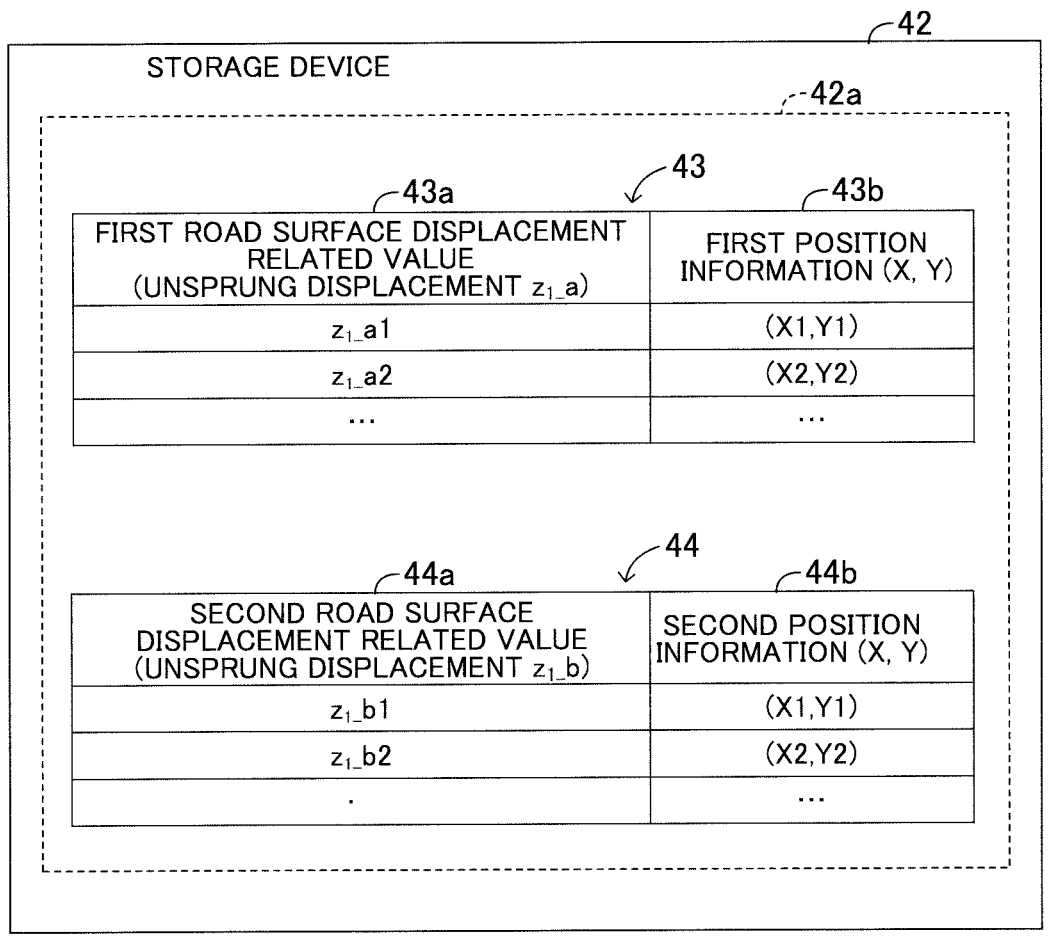
FIG. 3 shows an example of measurement data.

As shown in FIG. 3, the storage device 42 stores measurement data 42a. The measurement data 42a includes a set of data in which relationships are established among the road surface displacement related value obtained when a measurement vehicle, which will be described later, actually traveled on a road surface and position information representing the position (namely, the position of a wheel of the measurement vehicle) at the time when the road surface displacement related value was obtained. The measurement data 42a includes first data 43 and second data 44.

The first data 43 contains data of the road surface displacement related value used for computing target control force Fct of preview vibration damping control, which will be described later. In the first data 43, a first road surface displacement related value 43a and first position information 43b are related to each other.

The first road surface displacement related value 43a is the road surface displacement related value obtained when the measurement vehicle actually traveled on the road surface. In the present example, the first road surface displacement related value 43a is the unsprung displacement $z_1$. In the following description, the first road surface displacement related value 43a will be referred to as the "unsprung displacement $z_1\_a$."

The first position information 43b represents the position (for example, latitude and longitude) of the wheel of the measurement vehicle at the time when the first road surface displacement related value 43a was obtained. The first position information 43b represents the position on the road surface by two-dimensional (X, Y) coordinates. In FIG. 3, "X1, Y1" and "X2, Y2" are shown as examples of the position information.

Notably, as will be described later, the unsprung displacement $z_1\_a$ is obtained in the server 41 by executing an integration process whose integration error is small and a filter process which is free of phase shift. Accordingly, the first data 43 contains data of the unsprung displacement $z_1\_a$ whose error is small and which involves no phase shift.

The second data 44 is used so as to determine whether or not the road surface condition has changed after creation of the measurement data 42a. For such determination, the second data 44 contains data of the road surface displacement related value for collation (comparison) with the road surface displacement related value ($z_1\_c$, which will be described later) computed in the vehicle 10 in real time. In the second data 44, a second road surface displacement related value 44a and second position information 44b are related to each other.

The second road surface displacement related value 44a is the road surface displacement related value obtained when the measurement vehicle actually traveled on the road surface. In the present example, the second road surface displacement related value 44a is the unsprung displacement $z_1$. In the following description, the second road surface displacement related value 44a will be referred to as the "unsprung displacement $z_1\_b$."

Like the first position information 43b, the second position information 44b represents the position of the wheel of the measurement vehicle at the time when the second road surface displacement related value 44a was obtained.

Notably, as swill be described later, the unsprung displacement $z_1\_b$ is obtained in the measurement vehicle by executing an integration process and a filter process in real time. Due to the filter process, the unsprung displacement $z_1\_b$ has a phase shift (phase delay and/or phase advance). For example, in the case where a low-pass filter process is executed on the unsprung displacement $z_1\_b$, the unsprung displacement $z_1\_b$ has a phase delay. In the case where a high-pass filter process is executed on the unsprung displacement $z_1\_b$, the unsprung displacement $z_1\_b$ has a phase advance. Accordingly, the second data 44 contains data of the unsprung displacement $z_1\_b$ having a phase shift.

Meanwhile, as will be described later, the unsprung displacement $z_1\_c$ is similarly obtained in the vehicle 10 by executing an integration process and a filter process in real time. Due to the filter process, the unsprung displacement $z_1\_c$ has a phase shift. Although both the unsprung displacement $z_1\_b$ and the unsprung displacement $z_1\_c$ have phase shifts, since the unsprung displacement $z_1\_b$ and the unsprung displacement $z_1\_c$ are obtained through filter processes identical with each other (namely, filter processes having the same filter characteristics), the degree of phase shift of the unsprung displacement $z_1\_b$ and the degree of phase shift of the unsprung displacement $z_1\_c$ coincide with each other. Namely, the phase of the unsprung displacement $z_1\_b$ and the phase of the unsprung displacement $z_1\_c$ coincide with each other. Accordingly, it is possible to accurately determine whether or not the road surface condition has changed after creation of the measurement data 42a, by collating (comparing) the unsprung displacement $z_1\_b$ and the unsprung displacement $z_1\_c$.

Referring back to FIG. 2, the ECU 30 is connected to the left front wheel active actuator 17FL, the right front wheel active actuator 17FR, the left rear wheel active actuator 17RL, and the right rear wheel active actuator 17RR via a drive circuit (not shown).

The ECU 30 computes a target control force Fct for each active actuator 17. The target control force Fct is control force for the preview vibration damping control; namely, control force for damping the vibration of the sprung portion 51 of the vehicle 10. The ECU 30 controls the active actuator 17 in such a manner that, at a point in time when the wheel 11 passes a predicted passage position that will be described later, the active actuator 17 generates a control force Fc corresponding to (equal to) the target control force Fct.

(Outline of Basic Preview Vibration Damping Control)

Now, the outline of basic preview vibration damping control executed by the vibration damping control apparatus 20 will be described. FIG. 4 shows a single wheel model of the vehicle 10 on a road surface 55.

A spring 52 corresponds to the suspension spring 16, a damper 53 corresponds to the shock absorber 15, and an actuator 54 corresponds to the active actuator 17.

In FIG. 4, the mass of the sprung portion 51 is labeled as sprung mass $m_2$. As described above, $z_1$ represents displacement of the unsprung portion 50 in the vertical direction (unsprung displacement). Displacement of the sprung portion 51 in the vertical direction will be referred to as sprung displacement $z_2$. The sprung displacement $z_2$ is the vertical displacement of the sprung portion 51 corresponding to the position of each wheel 11. The spring constant (equivalent spring constant) of the spring 52 is labeled as spring constant K. The damping coefficient (equivalent damping coefficient) of the damper 53 is labeled as damping coefficient C. The force generated by the actuator 54 is labeled as control force Fc.

Furthermore, the derivative values of $z_1$ and $z_2$ with respect to time are denoted by $dz_1$ and $dz_2$, respectively, and the second-order derivative values of $z_1$ and $z_2$ with respect to time are denoted by $ddz_1$ and $ddz_2$, respectively. In the following description, it is prescribed that $z_1$ and $z_2$ assume positive values for upward displacements, and, for forces generated by the spring 52, the damper 53, the actuator 54, etc., upward is positive.

In the single wheel model of the vehicle 10 shown in FIG. 4, the equation of motion for the motion of the sprung portion 51 in the vertical direction can be represented by expression (1).

$$m_2 ddz_2 = C(dz_1 - dz_2) + K(z_1 - z_2) - Fc \quad (1)$$

The damping coefficient C in expression (1) is assumed to be constant. However, since the actual damping coefficient changes with the stroke speed of the suspension 13, the damping coefficient C may be set to, for example, a value which changes with the derivative value of the stroke H with respect to time.

Furthermore, in the case where the vibration of the sprung portion 51 is completely cancelled out by the control force Fc (namely, in the case where all the sprung acceleration $ddz_2$, the sprung speed $dz_2$ and the sprung displacement $z_2$ become zero), the control force Fc is represented by expression (2).

$$Fc = Cdz_1 + Kz_1 \quad (2)$$

Accordingly, the control force Fc for damping the vibration of the sprung portion 51 can be represented by expression (3), where α is a control gain. Notably, the control gain α is an arbitrary constant which is greater than 0 and not greater than 1.

$$Fc = \alpha(Cdz_1 + Kz_1) \quad (3)$$

When expression (3) is applied to expression (1), expression (1) can be represented by the following expression (4).

$$m_2 ddz_2 = C(dz_1 - dz_2) + K(z_1 - z_2) - \alpha(Cdz_1 + Kz_1) \quad (4)$$

When this expression (4) is subjected to Laplace transformation and is arranged, the following expression (5) is obtained. Namely, the transfer function from the unsprung displacement $z_1$ to the sprung displacement $z_2$ is represented by expression (5). Notably, "s" in expression (5) is a Laplacian operator.

$$\frac{z_2}{z_1} = \frac{(1-\alpha)(Cs+K)}{m_2 s^2 + Cs + K} \quad (5)$$

According to expression (5), the transfer function changes with the control gain α. Expression (5) shows that when the control gain α is an arbitrary value which is greater than 0 and not greater than 1, the magnitude of the transfer function certainly becomes smaller than "1" (namely, the vibration of the sprung portion 51 can be reduced). Furthermore, expression (5) shows that when the control gain α is 1, since the magnitude of the transfer function becomes "0," the vibration of the sprung portion 51 is completely cancelled out. On the basis of expression (3), the target control force Fct is computed in accordance with the following expression (6). The target control force Fct is a target control force for damping the vibration of the sprung portion generated when the wheel 11 passes the predicted passage position. Notably, the gain $\beta_1$ in expression (6) corresponds to αC, and the gain $\beta_2$ in expression (6) corresponds to αK.

$$Fct = \beta_1 \times dz_1 + \beta_2 \times z_1 \quad (6)$$

As described above, the ECU 30 previously obtains (reads ahead) the unsprung displacement $z_1$ at a position (predicted passage position) which the wheel 11 passes in the future, and applies the obtained unsprung displacement $z_1$ to expression (6), thereby computing the target control force Fct. Notably, since the term of the unsprung displacement $z_1$ and the term of the unsprung speed $dz_1$ on the right side of expression (6) are target control forces for damping the vibration of the sprung portion generated when the wheel 11 passes the predicted passage position, they can be said to be "target control forces for feedforward control."

The ECU 30 causes the actuator 54 to generate a control force Fc corresponding to the target control force Fct at a timing when the wheel 11 passes the predicted passage position (namely, a timing when the unsprung displacement $z_1$ applied to expression (6) occurs). As a result, the vibration of the sprung portion 51 can be reduced when the wheel 11 passes the predicted passage position (namely, when the unsprung displacement $z_1$ applied to expression (6) occurs).

Notably, the ECU 30 may compute the target control force Fct in accordance with the following expression (7) which is obtained by omitting the differential term ($\beta_1 \times dz_1$) from expression (6). In this case as well, the ECU 30 can cause the actuator 54 to generate the control force Fc for reducing the vibration of the sprung portion 51. Accordingly, as compared with the case where the control force Fc is not generated, the vibration of the sprung portion 51 can be reduced.

$$Fct = \beta_2 \times z_1 \quad (7)$$

The control for damping the vibration of the sprung portion 51 as described above will be referred to as "preview vibration damping control."

Notably, in the above-described single wheel model, the mass of the unsprung portion 50 and elastic deformation of a tire are ignored, and it is assumed that the unsprung displacement $z_1$ and the road surface displacement $z_0$ representing the displacement of the road surface 55 in the vertical direction are the same. In different examples, similar preview vibration damping control may be executed by using the road surface displacement $z_0$ and/or the road surface displacement speed $dz_0$ in place of or in addition to the unsprung displacement $z_1$ and the unsprung speed $dz_1$. Notably, $z_0$ and $dz_0$ also assume positive values for upward displacements.

(Outline of Preview Vibration Damping Control for Front Wheels and Rear Wheels)

Next, the outline of the preview vibration damping control will be described for the front wheels and the rear wheels, respectively, with reference to FIGS. 5 to 7. In the following description, for the "target control force Fct" and the "control force Fc," a suffix "_f" represents that the target control force Fct and the control force Fc are those for the front wheel 11F, and a suffix "_r" represents that the target control force Fct and the control force Fc are those for the rear wheel 11R.

Figure 5:
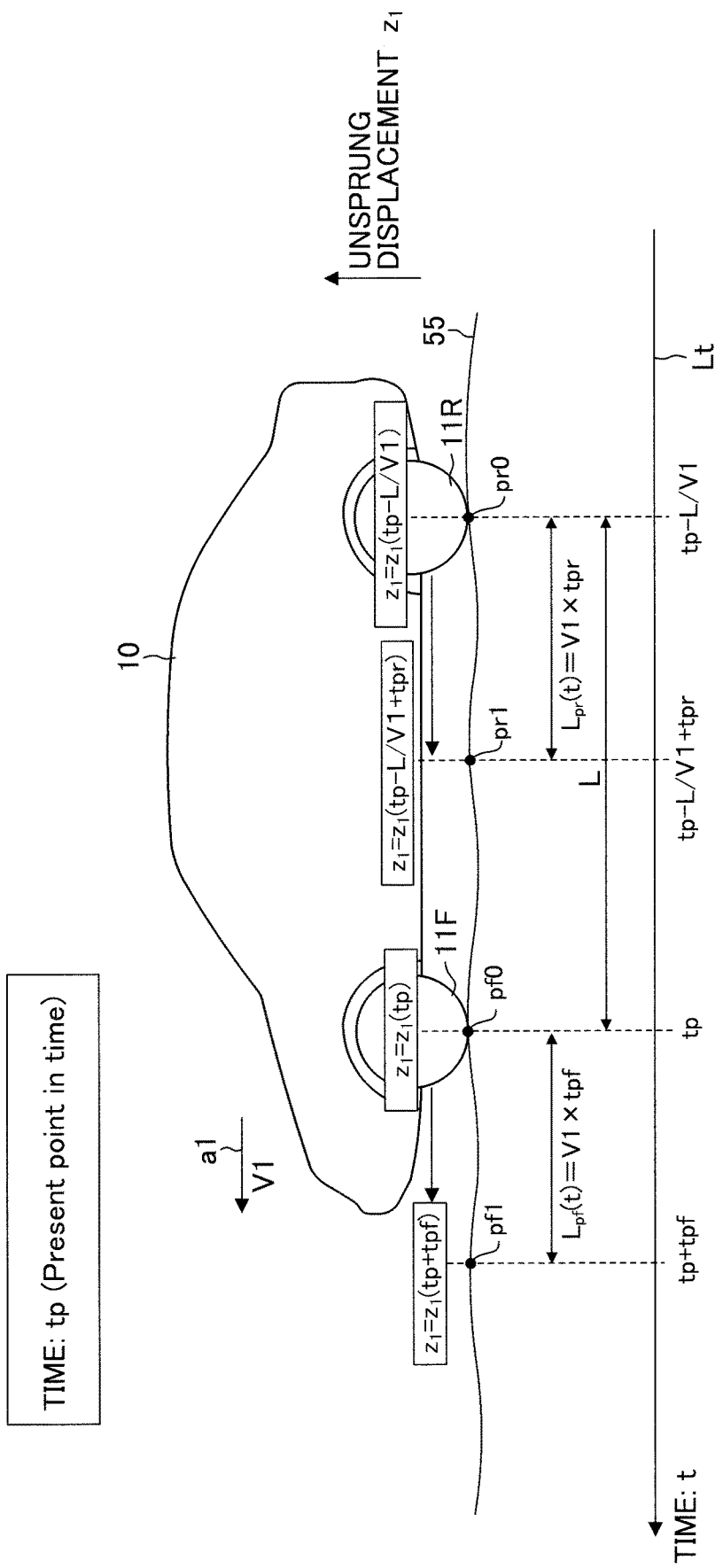
FIG. 5 is a chart used for describing preview vibration damping control.

FIG. 5 shows the vehicle 10 which is traveling at a speed V1 in a direction indicated by an arrow a1 at the present point in time tp. Notably, in the following description, the front wheel 11F and the rear wheel 11R are wheels on the left side or the right side, and the moving speeds of the front wheel 11F and the rear wheel 11R are considered to be the same as the speed V1.

In FIG. 5, a line Lt is a virtual time axis t. The unsprung displacement $z_1$ of the front wheel 11F on a moving route at time t at the present, in the past, and in the future is represented by a function $z_1(t)$ of time t. Therefore, the unsprung displacement $z_1$ of the front wheel 11F at a position (ground contact point) pf0 at the present point in time tp is represented as $z_1(tp)$. Furthermore, the unsprung displacement $z_1$ of the rear wheel 11R at a position pr0 at the present point in time tp is equal to the unsprung displacement $z_1$ of the front wheel 11F at a point in time "tp−L/V1" which is earlier than the present point in time tp by a time (L/V1) which the front wheel 11F took to move over a distance corresponding to a wheelbase L. Therefore, the unsprung displacement $z_1$ of the rear wheel 11R at the present point in time tp is represented as $z_1(tp-L/V1)$.

(Preview Vibration Damping Control for the Front Wheel 11F)

The ECU 30 determines a predicted passage position pf1 of the front wheel 11F at a point in time (future) which is later than the present point in time tp by a front wheel advance read time tpf. Notably, the front wheel advance read time tpf is set in advance to a time which is necessary for the front wheel active actuator 17F to output the control force Fc_f corresponding to the target control force Fct_f after the ECU 30 has determined the predicted passage position pf1.

The predicted passage position pf1 of the front wheel 11F is a position that the front wheel 11F is predicted to pass when the front wheel advance read time tpf elapses from the present point in time. The predicted passage position pf1 is apart from the position pf0 of the front wheel 11F at the present point in time tp by a front wheel advance read distance Lpf (=V1×tpf) along a predicted route of the front wheel 11F. The predicted route of the front wheel 11F is a route that the front wheel 11F is predicted to pass, and is, for example, a line which extends from the present position of the front wheel 11F in the heading direction Td of the vehicle 10 by a predetermined distance. As will be described later, the position pf0 is calculated on the basis of the present position of the vehicle 10 obtained by the position information obtaining device 31.

The ECU 30 previously obtains from the cloud 40 the first data 43 for a region (preparation section, which will be described later) in the vicinity of the present position of the vehicle 10. The ECU 30 obtains an unsprung displacement $z_1$(tp+tpf) on the basis of the predicted passage position pf1 and the first data 43 obtained beforehand. More specifically, the ECU 30 obtains from the first data 43 the unsprung displacement $z_1\_a$ at the predicted passage position pf1. Notably, since the unsprung displacement $z_1\_a$ for the predicted passage position pf1 is a piece of information obtained for execution of the preview vibration damping control, the unsprung displacement $z_1\_a$ may be referred to as the "preview information" in some cases.

The ECU 30 computes a target control force Fct_f (=βf× $z_1$(tp+tpf)) by applying the unsprung displacement $z_1$(tp+tpf) to the unsprung displacement $z_1$ of the following expression (8).

$$Fct\_f = \beta f \times z_1 \quad (8)$$

The ECU 30 transmits a control instruction containing the target control force Fct_f to the front wheel active actuator 17F such that the front wheel active actuator 17F generates a control force Fc_f corresponding to (equal to) the target control force Fct_f.

Figure 6:
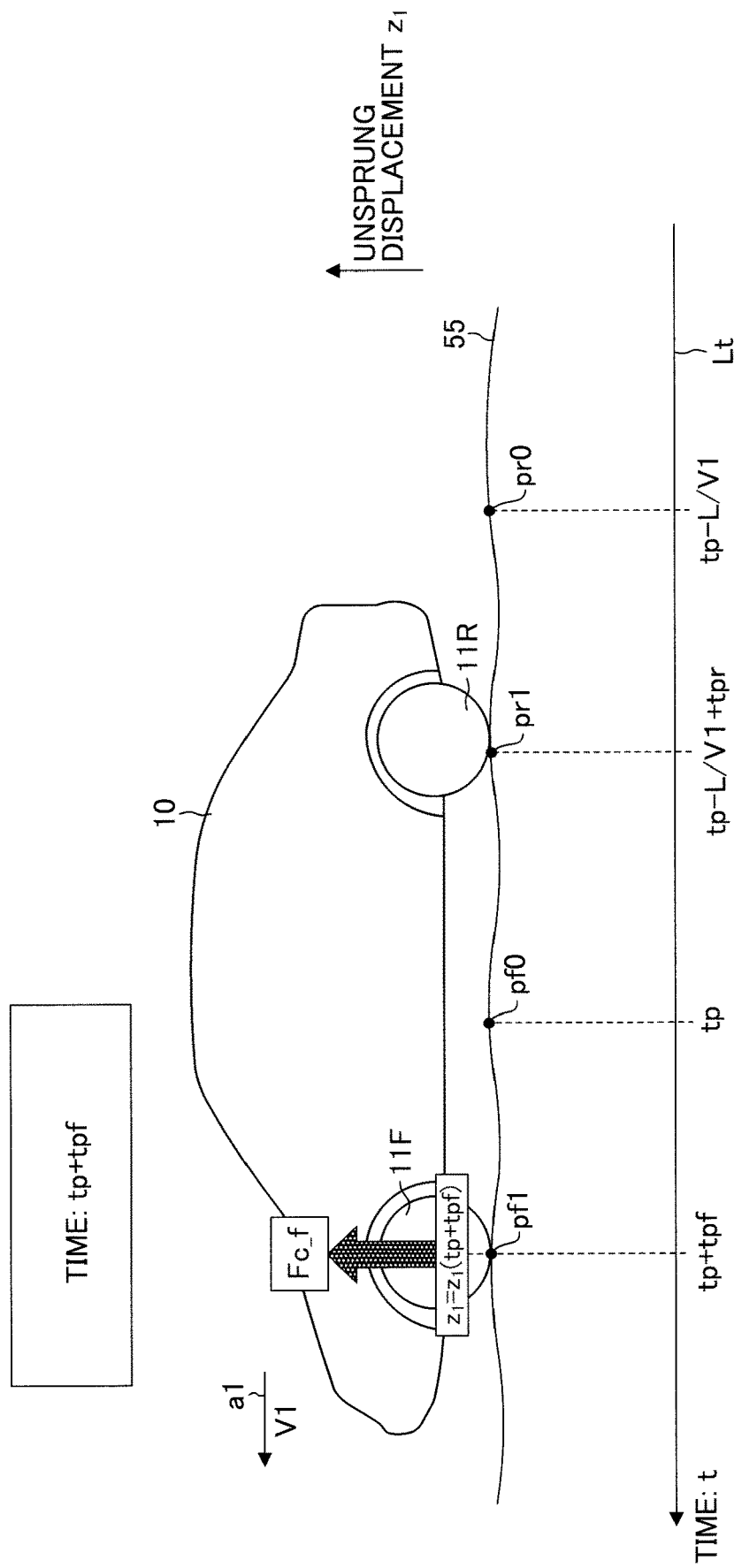
FIG. 6 is another chart used for describing the preview vibration damping control.

As shown in FIG. 6, the front wheel active actuator 17F generates the control force Fc_f corresponding to the target control force Fct_f at a point in time tp+tpf which is later than the present point in time tp by the front wheel advance read time tpf (namely, a timing when the front wheel 11F actually passes the predicted passage position pf1). Therefore, the front wheel active actuator 17F can generate at a proper timing the control force Fc_f which suppresses the vibration of the sprung portion 51 stemming from the unsprung displacement $z_1$ of the front wheel 11F at the predicted passage position pf1.

(Preview Vibration Damping Control for the Rear Wheel 11R)

As shown in FIG. 5, the ECU 30 determines a predicted passage position pr1 of the rear wheel 11R at a point in time (future) which is later than the present point in time tp by a rear wheel advance read time tpr. The rear wheel advance read time tpr is set in advance to a time which is necessary for the rear wheel active actuator 17R to output a control force Fc_r corresponding to the target control force Fct_r after the ECU 30 has determined the predicted passage position pr1.

Notably, in the case where the front wheel active actuator 17F and the rear wheel active actuator 17R differ in response, the front wheel advance read time tpf and the rear wheel advance read time tpr are set to different values in advance. In the case where the front wheel active actuator 17F and the rear wheel active actuator 17R are the same in response, the front wheel advance read time tpf and the rear wheel advance read time tpr are set to the same value beforehand.

The ECU 30 determines, as the predicted passage position pr1, a position that is apart from the position pr0 of the rear wheel 11R at the present point in time tp by a rear wheel advance read distance Lpr (=V1×tpr) along a predicted route of the rear wheel 11R for the case where the rear wheel 11R follows the same route as the front wheel 11F. The position pr0 is calculated on the basis of the present position of the vehicle 10 obtained by the position information obtaining device 31. Since the unsprung displacement $z_1$ at this predicted passage position pr1 is equal to the unsprung displacement $z_1$ at a point of time which is later, by the rear wheel advance read time tpr, than the "point in time (tp−L/V1) when the front wheel 11F was located at the position pr0 of the rear wheel 11R at the present point in time," the unsprung displacement $z_1$ at the predicted passage position pr1 can be represented as $z_1$(tp−L/V1+tpr). The ECU 30 obtains the unsprung displacement $z_1$(tp−L/V1+tpr) on the basis of the predicted passage position pr1 and the first data 43 obtained beforehand. More specifically, the ECU 30 obtains, from the first data 43, the unsprung displacement $z_1\_a$ at the predicted passage position pr1 as the preview information.

Furthermore, the ECU 30 computes a target control force Fct_r (=(βr×$z_1$(tp−L/V1+tpr)) by applying the unsprung displacement $z_1$(tp−L/V1+tpr) to the unsprung displacement $z_1$ of the following expression (9). Notably, the gain βf in expression (8) and the gain βr in expression (9) are set to values different from each other. This is because the spring constant Kf of the left front wheel suspension 13FL and the right front wheel suspension 13FR differs from the spring constant Kr of the left rear wheel suspension 13RL and the right rear wheel suspension 13RR.

$$Fct\_r = \beta r \times z_1 \quad (9)$$

The ECU 30 transmits a control instruction containing the target control force Fct_r to the rear wheel active actuator 17R such that the rear wheel active actuator 17R generates a control force Fc_r corresponding to (equal to) the target control force Fct_r.

Figure 7:
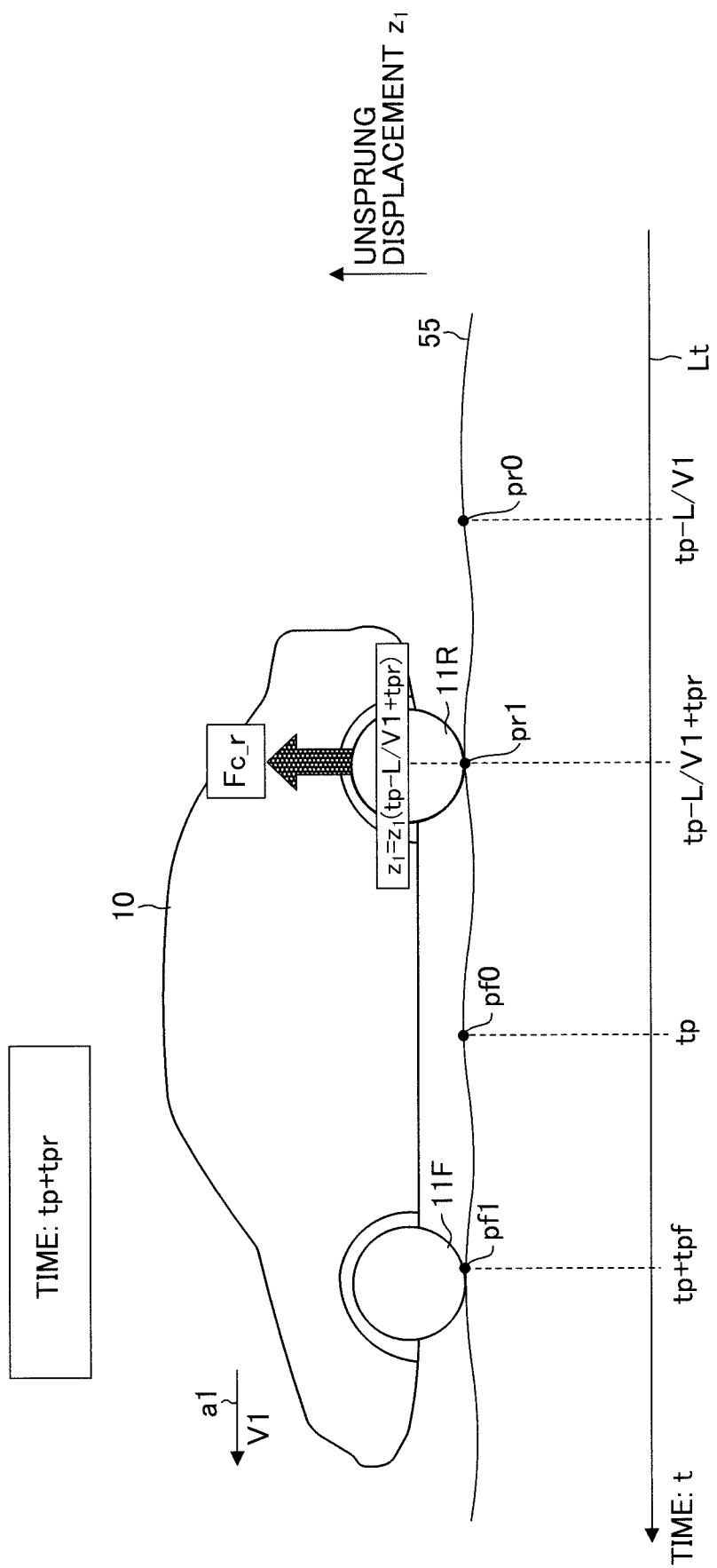
FIG. 7 is still another chart used for describing the preview vibration damping control.

As shown in FIG. 7, the rear wheel active actuator 17R generates the control force Fc_r corresponding to the target control force Fct_r at a point in time tp+tpr which is later than the present point in time tp by the rear wheel advance read time tpr (namely, a timing when the rear wheel HR actually passes the predicted passage position pr1). Therefore, the rear wheel active actuator 17R can generate at a proper timing the control force Fc_r which suppresses the vibration of the sprung portion 51 stemming from the unsprung displacement $z_1$ of the rear wheel 11R at the predicted passage position pr1.

(Outline of Operation)

As described above, due to roadwork performed on a road or changes of the road with time, the road surface condition may change. If the vibration damping control apparatus 20 continues the preview vibration damping control, while using the target control forces Fct_f and Fct_r computed in accordance with expression (8) and expression (9), in a state in which the vehicle 10 is traveling on the road whose road surface condition has changed, there arises the possibility that the vibration of the sprung portion 51 increases.

In view of this, the vibration damping control apparatus 20 operates as follows. The vibration damping control apparatus 20 computes the unsprung displacement $z_1$ at a passage position that the wheel 11 has passed at the present point in time. In the following description, the unsprung displacement $z_1$ at the passage position will be referred to as the "unsprung displacement $z_1\_c$ (first value)." Specifically, the vibration damping control apparatus 20 computes the unsprung displacement $z_1\_c$ on the basis of the sprung acceleration $ddz_2$ detected by the vertical acceleration sensor 34 and the stroke H detected by the stroke sensor 35. Furthermore, the vibration damping control apparatus 20 obtains, from the second data 44, the unsprung displacement $z_1\_b$ (second value) at the passage position (namely, at the position of the wheel 11 at which the unsprung displacement $z_1\_c$ was obtained).

Subsequently, the vibration damping control apparatus 20 determines whether or not a first condition is satisfied. The first condition is a condition which is satisfied when the probability that the road surface condition at the passage position has changed after creation of the measurement data 42a is high. The vibration damping control apparatus 20 computes the magnitude (absolute value) Dz1 of the difference between the unsprung displacement $z_1\_c$ and the unsprung displacement $z_1\_b$ (Dz1=|$z_1\_c-z_1\_b$|). The first condition is satisfied when the value Dz1 is equal to or greater than a positive first threshold Th1.

It is assumed that the vehicle 10 travels in a section (hereinafter referred to as a "particular section") where the road surface condition had changed greatly after a past point in time when the measurement data 42a was created (namely, the point in time when the unsprung displacement $z_1\_b$ was obtained).

Whereas the road surface condition at a certain position Po within the particular section was convex at the point in time when the measurement data 42a was created, the road surface condition at the position Po is concave at the present point in time. The vibration damping control apparatus 20 executes the preview vibration damping control when the vehicle 10 passes the position Po. At that time, the vibration damping control apparatus 20 controls the active actuator 17 in a direction opposite a direction for cancelling out a vibration generated in the vehicle 10. In this case, the value Dz1 becomes equal to or greater than the first threshold Th1, and the first condition is satisfied. Accordingly, the vibration damping control apparatus 20 can estimate that the vehicle 10 is traveling in the particular section.

When the vibration damping control apparatus 20 continues the preview vibration damping control by using the target control forces Fct_f and Fct_r computed in accordance with expression (8) and expression (9) in a state in which the first condition is satisfied, there arises the possibility that the vibration of the sprung portion 51 increases further. Accordingly, in the case where the first condition is satisfied, the vibration damping control apparatus 20 executes control for setting the magnitude (absolute value) the target control force Fct to become smaller as compared with the case where the first condition is not satisfied. In the following description, such control will be referred to as the "particular control." In the particular control, the vibration damping control apparatus 20 computes target control forces Fct_f and Fct_r in accordance with the following expressions (10) and (11), respectively, wherein each of βf' and βr' is a gain. The gain βf' is smaller than the gain βf in expression (8). The gain βr' is smaller than the gain βr in expression (9).

$$Fct\_f = \beta f' \times z_1 \quad (10)$$

$$Fct\_r = \beta r' \times z_1 \quad (11)$$

Since the particular control decreases the control force Fc generated by the active actuator 17, it is possible to reduce the possibility that the vibration of the sprung portion 51 increases.

After the vibration damping control apparatus 20 has started the particular control, the vibration damping control apparatus 20 determines whether or not a second condition is satisfied. The second condition is a condition which is satisfied when the probability that the road surface condition at the passage position has not changed after creation of the measurement data 42a is high. Specifically, the second condition is satisfied when the value Dz1 (=|$z_1\_c-z_1\_b$|) has become equal to or smaller than a positive second threshold Th2. The second threshold Th2 is a value equal to or smaller than the first threshold Th1. In the case where the value Dz1 has become equal to or smaller than the second threshold Th2, it is possible to estimate that the vehicle 10 has left the particular section. Accordingly, the vibration damping control apparatus 20 ends the particular control. As a result, the vibration damping control apparatus 20 executes the preview vibration damping control by using the target control forces Fct_f and Fct_r computed in accordance with expression (8) and expression (9), whereby the vibration of the sprung portion 51 can be suppressed.

(Vibration Damping Control Routine)

Every time a predetermined time elapses, the CPU of the ECU 30 (hereinafter referred to as the "CPU1") executes a vibration damping control routine shown in FIG. 8 and a flag setting routine shown in FIG. 9. The CPU1 executes the routine of FIG. 8 and the routine of FIG. 9 for each of the wheels (11FL and 11RL) on the left side and the wheels (11FR and 11RR) on the right side.

Notably, by executing an unillustrated routine every time a predetermined time elapses, the CPU1 previously obtains the first data 43 for the preparation section from the cloud 40 and temporarily stores the first data 43 in the RAM 30c (or the storage device 37). The preparation section is a section of a road which the vehicle 10 is predicted to pass later on. For example, the preparation section is a section which starts at the front wheel predicted passage position pf1 and ends at a position that is apart from this front wheel predicted passage position pf1 by a predetermined preparation distance in the heading direction Td of the vehicle 10. Furthermore, the preparation distance is set to a value which is sufficiently larger than the above-described front wheel advance read distance Lpf.

Figure 8:
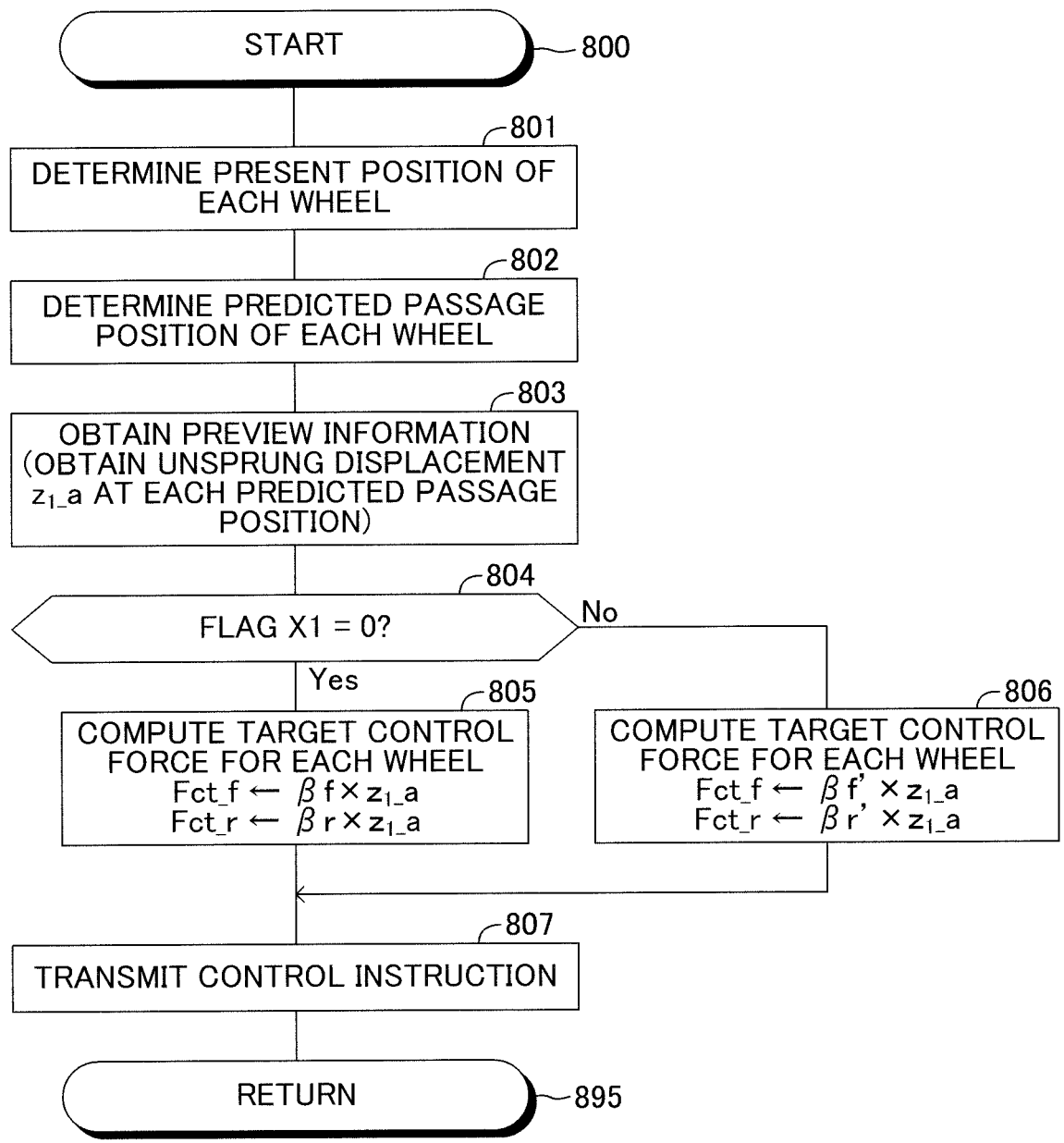
FIG. 8 is a flowchart representing a "vibration damping control routine" executed by a CPU of an electronic controller (30) according to the embodiment.

When a predetermined timing has come, the CPU1 starts the process from step 800 of FIG. 8, executes step 801 to step 803 in this order, and then proceeds to step 804.

Step 801: The CPU1 determines the present position of each wheel 11. Specifically, the CPU1 obtains the present position of the vehicle 10 and the heading direction Td of the vehicle 10 from the position information obtaining device 31. Positional relationship data representing the relationship between the position of each wheel 11 and the mounting position of the GNSS receiver in the vehicle 10 are stored in the ROM 30b of the ECU 30 beforehand. The present position of the vehicle 10 obtained from the position information obtaining device 31 corresponds to the mounting position of the GNSS receiver. Accordingly, the CPU1 determines the present position of each wheel 11 by referring to the present position of the vehicle 10, the heading direction Td of the vehicle 10, and the above-described positional relation data.

Step 802: The CPU1 determines the predicted passage position of each wheel 11 in a manner described below.

The CPU1 determines a predicted route of the front wheel 11F. The predicted route of the front wheel 11F is a route along which the front wheel 11F is predicted to move. The CPU1 computes the front wheel advance read distance Lpf by multiplying the vehicle speed Vs by the front wheel advance read time tpf. Furthermore, the CPU1 determines, as the front wheel predicted passage position pf1, a position that the front wheel 11F reaches as a result of advancement over the front wheel advance read distance Lpf from its present position along the predicted route of the front wheel 11F.

The CPU1 determines a predicted route of the rear wheel 11R under the assumption that the rear wheel 11R follows the same route as the front wheel 11F. The CPU1 computes the rear wheel advance read distance Lpr by multiplying the vehicle speed Vs by the rear wheel advance read time tpr. Furthermore, the CPU1 determines, as the rear wheel predicted passage position pr1, a position that the rear wheel 11R reaches as a result of advancement over the rear wheel advance read distance Lpr from its present position along the predicted route of the rear wheel 11R.

Step 803: The CPU1 obtains the preview information from the first data 43 stored in the RAM 30c. Specifically, the CPU1 obtains the unsprung displacement $z_1\_a$ at the front wheel predicted passage position pf1 and the unsprung displacement $z_1\_a$ at the rear wheel predicted passage position pr1.

When the CPU1 proceeds to step 804, the CPU1 determines whether or not the value of a flag X1 is "0." The value of the flag X1 is set in the routine of FIG. 9, which will be described later. When the value of the flag X1 is "0," this means that the road surface condition has not changed greatly after a past point in time (a point in time when the measurement data 42a was created) and accordingly, the particular control is not executed. When the value of the flag X1 is "1," this means that the road surface condition has changed greatly after the past point in time and therefore, the particular control is executed. The value of the flag X1 is set to "0" in an initialization routine executed when an unillustrated ignition switch is switched from an OFF position to an ON position.

It is assumed that the value of the flag X1 is currently "0." In this case, the CPU1 makes a "Yes" determination in step 804, executes step 805 and step 807, which will be described below, in this order, and then proceeds to step 895 so as to end the current execution of the present routine.

Step 805: The CPU1 computes the target control force Fct_f for the front wheel 11F by applying to expression (8) the unsprung displacement $z_1\_a$ at the front wheel predicted passage position pf1 obtained in step 803. The CPU1 computes the target control force Fct_r for the rear wheel 11R by applying to expression (9) the unsprung displacement $z_1\_a$ at the rear wheel predicted passage position pr1 obtained in step 803.

Step 807: The CPU1 transmits a control instruction containing the target control force Fct_f to the front wheel active actuator 17F and transmits a control instruction containing the target control force Fct_r to the rear wheel active actuator 17R.

Meanwhile, in the case where the value of the flag X1 is "1," the CPU1 makes a "No" determination in step 804 and proceeds to step 806. In step 806, the CPU1 executes the particular control. The CPU1 computes the target control force Fct_f for the front wheel 11F by applying to expression (10) the unsprung displacement $z_1\_a$ at the front wheel predicted passage position pf1 obtained in step 803. The CPU1 computes the target control force Fct_r for the rear wheel 11R by applying to expression (11) the unsprung displacement $z_1\_a$ at the rear wheel predicted passage position pr1 obtained in step 803. Subsequently, in step 807, the CPU1 transmits a control instruction containing the target control force Fct_f to the front wheel active actuator 17F and transmits a control instruction containing the target control force Fct_r to the rear wheel active actuator 17R. After that, the CPU1 proceeds to step 895 and ends the current execution of the present routine.

Figure 9:
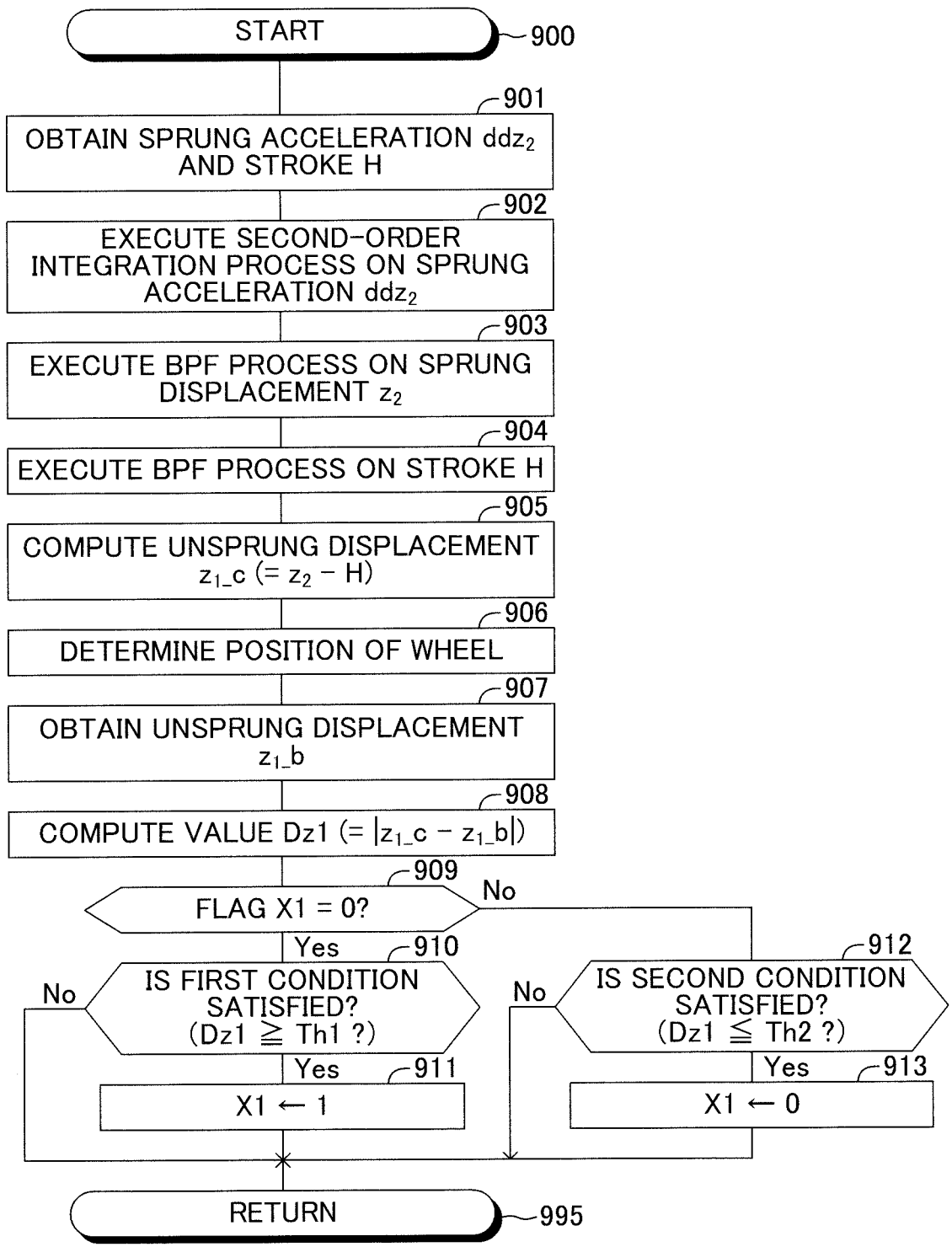
FIG. 9 is a flowchart representing a "flag setting routine" executed by the CPU of the electronic controller (30) according to the embodiment.

In the present example, the CPU1 executes the routine of FIG. 9 for the front wheel 11F. Notably, by executing an unillustrated routine every time a predetermined time elapses, the CPU1 obtains, from the cloud 40, the second data 44 for the preparation section in advance, and temporarily stores the second data 44 in the RAM 30c (or the storage device 37). Notably, the second data 44 is held in the RAM 30c until the value Dz1 is computed for the passage position of the wheel 11.

When a predetermined timing has come, the CPU1 starts the process from step 900 of FIG. 9 and executes the processes of step 901 to step 908 in this order. Subsequently, the CPU1 proceeds to step 909.

Step 901: The CPU1 obtains the sprung acceleration $ddz_2$ from the vertical acceleration sensor 34 and obtains the stroke H from the stroke sensor 35.

Step 902: The CPU1 executes a second-order integration process on the sprung acceleration $ddz_2$, thereby computing the sprung displacement $z_2$.

Step 903: The CPU1 executes a band-pass filter process (hereinafter referred to as the "BPF process") on a time series change of the sprung displacements $z_2$. The BPF process allows passage of only components in a specific frequency band. Accordingly, data of the sprung displacement $z_2$, from which components outside the specific frequency band have been removed, is produced.

Step 904: The CPU1 executes the BPF process on a time series change of the stroke H. Accordingly, data of the stroke H, from which components outside the specific frequency band have been removed, is produced.

The above-described specific frequency band may be a frequency band selected to contain at least the resonance frequency of the sprung portion. In the present example, the specific frequency band ranges from a first cutoff frequency to a second cutoff frequency. The first cutoff frequency is set to be lower than the resonance frequency of the sprung portion. The second cutoff frequency is set to be lower than the resonance frequency of the upsprung portion and higher than the resonance frequency of the sprung portion. By the above-described BPF processes, components in a low frequency region, including errors stemming from sensor drifts, are removed.

Step 905: The CPU1 subtracts the BPF processed stroke H ($=z_2-z_1$) from the BPF processed sprung displacement $z_2$, thereby computing the unsprung displacement $z_1\_c$.

Notably, due to the BPF process of step 903 and the BPF process of step 904, the unsprung displacement $z_1\_c$ computed in step 905 has a phase shift.

Step 906: The CPU1 determines the position (passage position) of the wheel 11 (the front wheel 11F) by referring to the present position of the vehicle 10, the heading direction Td of the vehicle 10, and the positional relationship data as described above. Subsequently, the CPU1 relates the passage position of the front wheel 11F to the unsprung displacement $z_1\_c$ computed in step 905.

Step 907: The CPU1 obtains, from the second data 44 stored in the RAM 30c, the unsprung displacement $z_1\_b$ corresponding to the passage position of the front wheel 11F determined in step 906.

Step 908: The CPU1 computes the value Dz1 ($=|z_1\_c-z_1\_b|$) on the basis of the unsprung displacement $z_1\_c$ computed in step 905 and the unsprung displacement $z_1\_b$ obtained in step 907.

Figure 10:
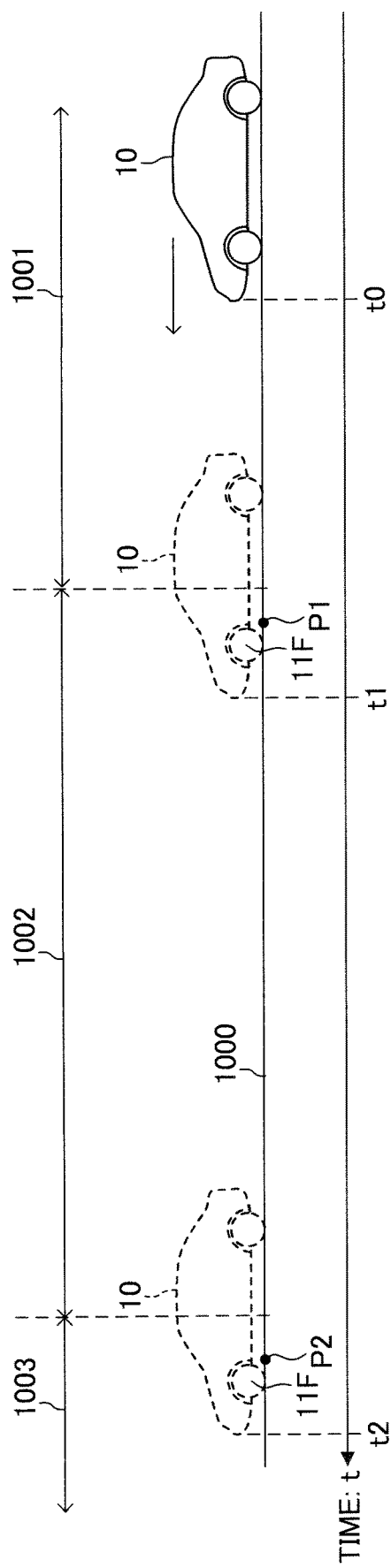
FIG. 10 is a chart showing a situation where a vehicle travels on a road including a section where the road surface condition of the road has changed.

When the CPU1 proceeds to step 909, the CPU1 determines whether or not the value of the flag X1 is "0." It is assumed that the vehicle 10 is currently traveling on a road 1000 as in an example shown in FIG. 10. The road 1000 includes a first section 1001, a second section 1002, and a third section 1003. The first section 1001 and the third section 1003 are sections in which the road surface condition has not changed after creation of the measurement data 42a. Meanwhile, the second section 1002 is a section in which the road surface condition has changed greatly after creation of the measurement data 42a and corresponds to the above-described particular section.

At time t0, the vehicle 10 is traveling in the first section 1001. Since the value of the flag X1 is still "0" at at this point in time, the CPU1 makes a "Yes" determination in step 909 and proceeds to step 910.

In step 910, the CPU1 determines whether or not the first condition is satisfied. Namely, the CPU1 determines whether or not the value Dz1 is equal to or greater than the first threshold Th1. At time t0, the value Dz1 does not become equal to or greater than the first threshold Th1. Accordingly, the CPU1 makes a "No" determination in step 910 and proceeds directly to step 995 so as to end the current execution of the present routine.

After that, as shown in FIG. 10, the vehicle 10 enters the second section 1002 at time t1. The front wheel 11F then passes a position P1 in the second section 1002. In this situation, the CPU1 starts the routine of FIG. 9 from step 900, executes the processes of step 901 to step 909, and then proceeds to step 910. The difference between the unsprung displacement $z_1\_c$ at the passage position P1 of the front wheel 11F and the unsprung displacement $z_1\_b$ at the passage position P1 is large, and therefore, the value Dz1 becomes equal to or greater than the first threshold Th1. Accordingly, the CPU1 makes a "Yes" determination in step 910 and proceeds to step 911 so as to set the value of the flag X1 to "1." After that, the CPU1 proceeds to step 995 so as to end the current execution of the present routine. As a result, the CPU1 makes a "No" determination in step 804 of the routine of FIG. 8 and proceeds to step 806. Accordingly, the particular control is executed.

After that, the CPU1 starts the routine of FIG. 9 from step 900, executes the processes of step 901 to step 908, and then proceeds to step 909. Since the value of the flag X1 is "1," the CPU1 makes a "No" determination in step 909 and proceeds to step 912.

In step 912, the CPU1 determines whether or not the second condition is satisfied. Namely, the CPU1 determines whether or not the value Dz1 is equal to or less than the second threshold Th2. The value Dz1 does not become equal to or less than the second threshold Th2 while the vehicle 10 is traveling in the second section 1002. Accordingly, the CPU1 makes a "No" determination in step 912 and proceeds directly to step 995 so as to end the current execution of the present routine. Accordingly, the particular control is continued.

After that, at time t2, the vehicle 10 leaves the second section 1002 and enters the third section 1003. The front wheel 11F then passes a position P2 in the third section 1003. In this situation, the CPU1 starts the routine of FIG. 9 from step 900, executes the processes of step 901 to step 909, and then proceeds to step 912. In this case, since the value Dz1 becomes equal to or less than the second threshold Th2, the CPU1 makes a "Yes" determination in step 912 and proceeds to step 913 so as to set the value of the flag X1 to "0." As a result, the CPU1 makes a "Yes" determination in step 804 of the routine of FIG. 8 and proceeds to step 805. Accordingly, the particular control is ended.

As can be understood from the above, the vibration damping control apparatus 20 executes the particular control when the first condition is satisfied. For example, when the vehicle 10 starts to travel in the second section 1002 (section in which the road surface condition has changed greatly after creation of the measurement data 42a), the vibration damping control apparatus 20 executes the preview vibration damping control while using the target control forces Fct_f and Fct_r computed in accordance with expression (10) and expression (11). Accordingly, the magnitudes of the target control forces Fct_f and Fct_r become smaller as compared with the case where the first condition is not satisfied. Since the control force Fc generated by the active actuator 17 becomes smaller in the situation where the vehicle 10 is traveling in the second section 1002, it is possible to reduce the possibility that the vibration of the sprung portion 51 increases. As described above, the drive of the active actuator 17 is restrained in an improper situation where the drive of the active actuator 17 increases the vibration of the sprung portion 51. Therefore, it is possible to reduce the possibility that excess energy is consumed by the active actuator 17. Furthermore, it is possible to prevent generation of heat in the active actuator 17 and wear of components of the active actuator 17.

Furthermore, after having started the particular control, the vibration damping control apparatus 20 determines whether or not the second condition is satisfied. In the case where the second condition is satisfied, the vibration damping control apparatus 20 ends the particular control. For example, when the vehicle 10 leaves the second section 1002 and enters the third section 1003 (section in which the road surface condition has not changed after creation of the measurement data 42a), the vibration damping control apparatus 20 ends the particular control. As a result, the vibration damping control apparatus 20 executes the preview vibration damping control while using the target control forces Fct_f and Fct_r computed in accordance with expression (8) and expression (9). As a result, the vibration of the sprung portion 51 can be suppressed. As described above, the vibration damping control apparatus 20 can determine whether or not the road surface condition of the road on which the vehicle 10 travels has changed, and change the target control force in the preview vibration damping control in accordance with the result of the determination.

(Configuration of Data Management System)

Figure 11:
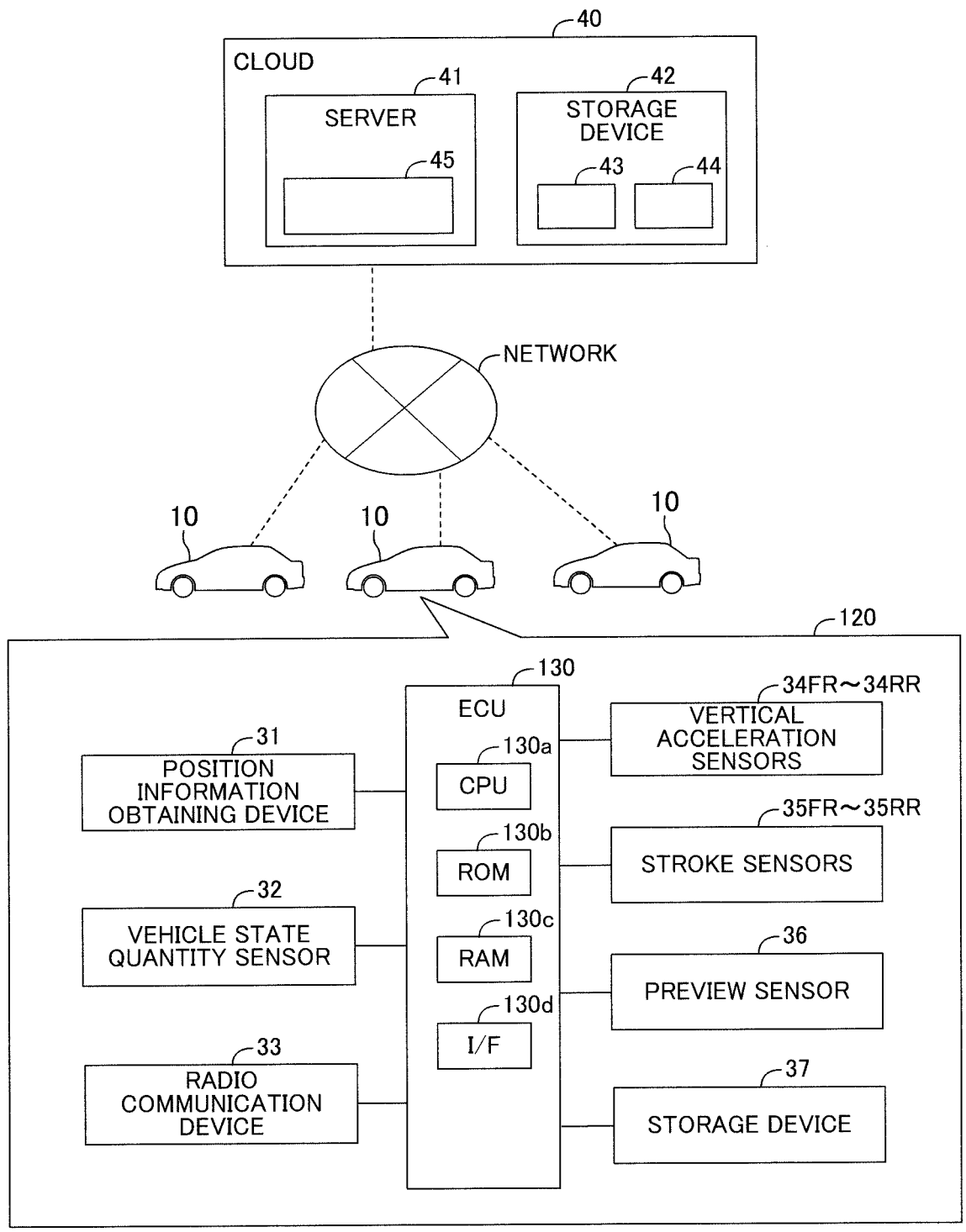
FIG. 11 is a schematic diagram of a data management system according to the embodiment.

A data management system according to the embodiment is a system for creating the measurement data 42a (the first data 43 and the second data 44). As shown in FIG. 11, the data management system includes a plurality of measurement vehicles (in the present example, a plurality of vehicles 10) and the cloud 40. Each vehicle 10 includes a data collection device 120. The data collection device 120 includes an electronic controller 130 (hereinafter referred to as the "ECU 130"), a position information obtaining device 31, a vehicle state quantity sensor 32, a radio communication device 33, vertical acceleration sensors 34FR to 34RR, stroke sensors 35FR to 35RR, a preview sensor 36, and a storage device 37.

The ECU 130 includes a microcomputer containing a CPU 130a, a ROM 130b, a RAM 130c, an interface (I/F) 130d, etc. The ECU 130 is connected to the position information obtaining device 31, the vehicle state quantity sensor 32, the radio communication device 33, the vertical acceleration sensors 34FR to 34RR, the stroke sensors 35FR to 35RR, and the preview sensor 36. Since the configurations of these devices and sensors have already been described, their detailed descriptions will not be repeated.

(Creation of First Data)

The details of data processing which is performed so as to create the first data 43 will be described. The ECU 130 obtains a predetermined time series data (hereinafter referred to as "sensing data") for each wheel 11. Subsequently, the ECU 130 transmits the sensing data to the server 41 via the radio communication device 33. The sensing data includes time series data of the position of the wheel 11, time series data of the sprung acceleration $ddz_2$, and time series data of the stroke H. Notably, in the sensing data, the position of the wheel 11, the sprung acceleration $ddz_2$, and the stroke H are added with pieces of information representing times when these values were detected.

Every time a predetermined time elapses, the CPU of the server 41 (hereinafter referred to as the "CPU2") executes a first data creation routine shown in FIG. 12.

Notably, by executing an unillustrated routine every time a predetermined time elapses, the CPU2 receives sensing data from each of the plurality of vehicles 10 and accumulates the received sensing data in the storage device 42.

Figure 12:
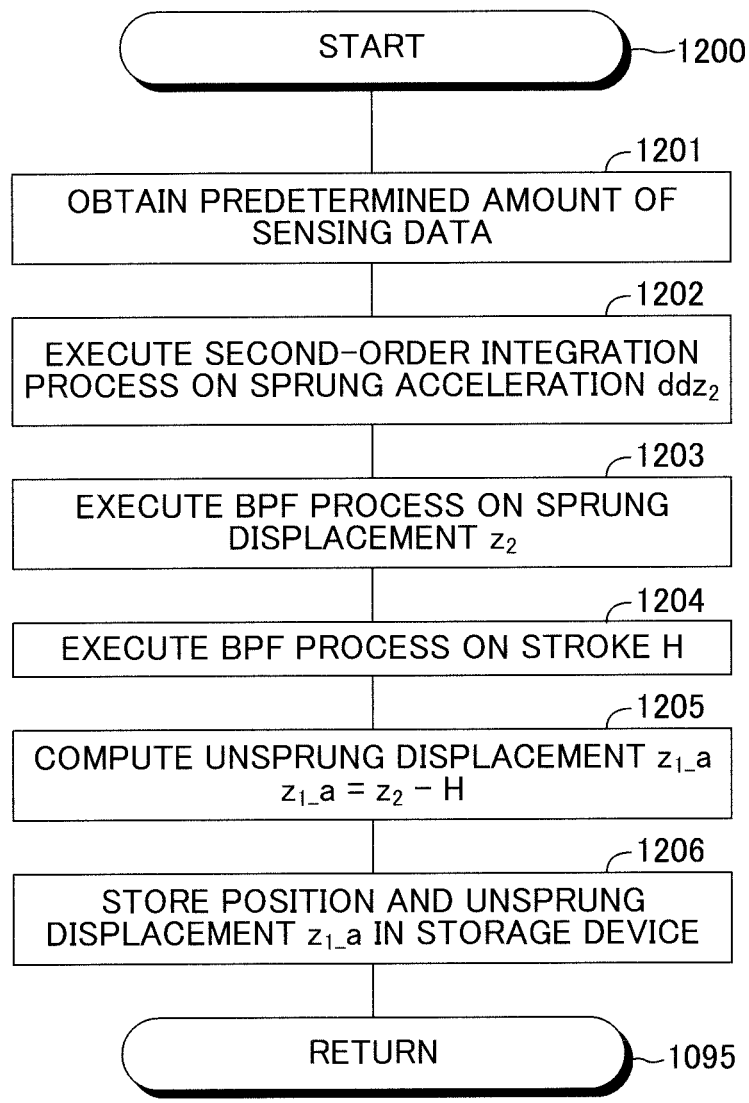
FIG. 12 is a flowchart representing a "first data creation routine" executed by a CPU of a server (41) according to the embodiment.

When a predetermined timing has come, the CPU2 starts the process from step 1200 of FIG. 12 and executes the processes of step 1201 to step 1206 in this order. Subsequently, the CPU2 proceeds to step 1295 and ends the current execution of the present routine.

Step 1201: The CPU2 obtains a predetermined amount of sensing data from the storage device 42. For example, the predetermined amount is set to an amount determined such that an ideal integration process whose integration error is small can be executed in the next step 1202.

Step 1202: The CPU2 executes a second-order integration process on the time series data of the sprung acceleration $ddz_2$, thereby producing time series data of the sprung displacement $z_2$.

Step 1203: The CPU2 executes a BPF process on the time series data of the sprung displacement $z_2$. Accordingly, time series data of the sprung displacement $z_2$ from which components outside the specific frequency band have been removed is produced.

The BPF process in step 1203 is performed by a zero-phase filter process. Namely, the CPU2 performs on the time series data of the sprung displacements $z_2$ both a process performed in the forward direction on the time axis (a BPF process in which the time series data is processed from the first value toward the last value) and a process performed in the backward direction on the time axis (a BPF process in which the time series data is processed from the last value toward the first value), and adds the results of the processes together for averaging. It is known that, in such a zero-phase filter process, phase shift due to filtering does not occur. In a different example, the BPF process may be performed by using FFT (Fast Fourier Transform).

Step 1204: The CPU2 executes a BPF process on the time series data of the stroke H. As in the above-described case, the BPF process is performed by the zero-phase filter process. Notably, the BPF process may be performed by using FFT. Accordingly, time series data of the stroke H from which components outside the specific frequency band have been removed is produced.

Step 1205: The CPU2 subtracts the BPF processed stroke H from the BPF processed sprung displacement $z_2$, thereby producing time series data of the unsprung displacement $z_1\_a$.

Step 1206: The CPU2 relates the time series data of the position of the wheel 11 and the time series data of the unsprung displacement $z_1\_a$ with each other. Subsequently, the CPU2 stores the combination of the position of the wheel 11 and the unsprung displacement $z_1\_a$ in the storage device 42 as the first data 43.

The server 41 does not execute the integration process and the BPF processes on the sensing data in real time, and processes a predetermined amount of sensing data together at a certain timing. Such a process will be called "offline process" in some cases. Since the server 41 performs the integration process and the BPF processes on the sensing data offline, no limitation is imposed on computation time unlike the case of real time processing. Furthermore, the server 41 can perform an ideal integration process whose integration error is small and a filter process which is free from phase shift. Therefore, the server 41 can create the first data 43 containing the road surface displacement related value (the unsprung displacement $z_1\_a$) which is accurate.

(Creation of Second Data)

The details of data processing which is performed so as to create the second data 44 will be described. Every time a predetermined time elapses, the CPU of the ECU 130 (hereinafter referred to as the "CPU3") executes a second data creation routine shown in FIG. 13. The CPU3 executes the routine of FIG. 13 for each wheel 11.

Figure 13:
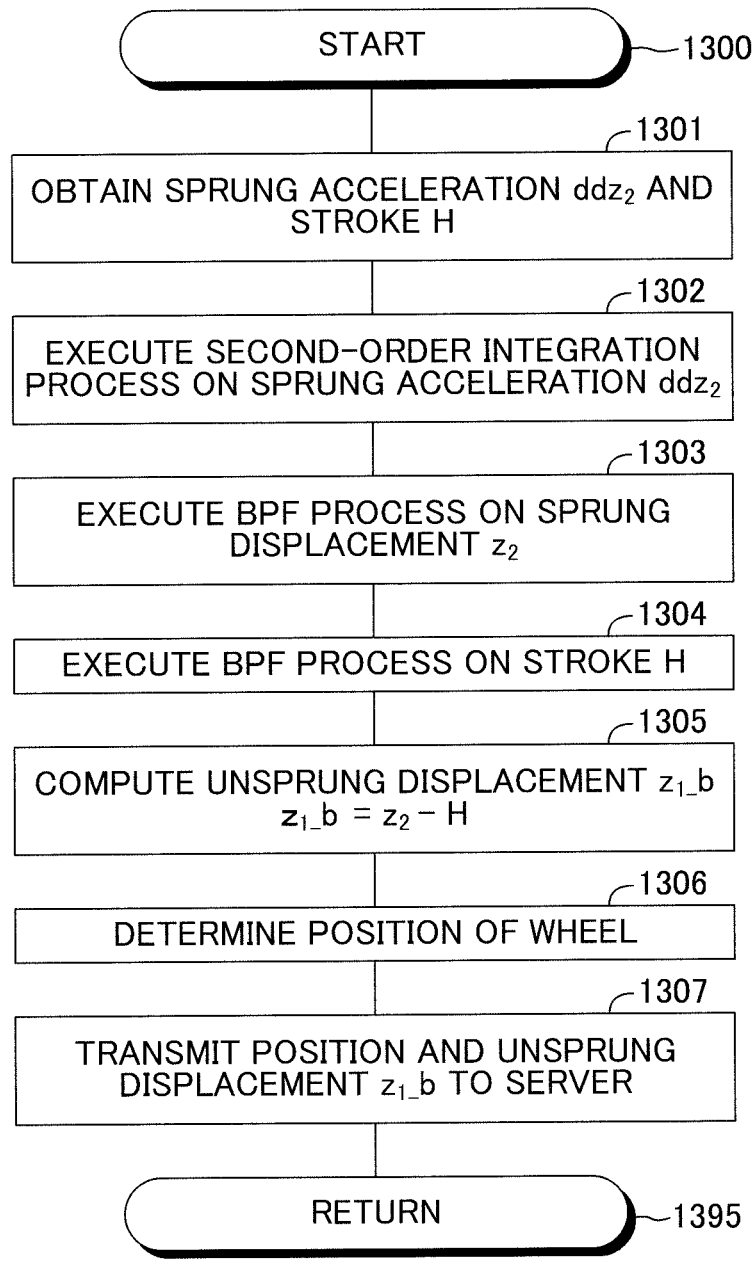
FIG. 13 is a flowchart representing a "second data creation routine" executed by a CPU of an electronic controller (130) according to the embodiment.

When a predetermined timing has come, the CPU3 starts the process from step 1300 of FIG. 13 and executes the processes of step 1301 to step 1307 in this order. Subsequently, the CPU3 proceeds to step 1395 and ends the current execution of the present routine.

The processes of step 1301 to step 1304 are identical to the processes of step 901 to step 904 of the routine of FIG. 9. Accordingly, the detailed description of these processes is omitted.

Step 1305: The CPU3 subtracts the BPF processed stroke H ($=z_2-z_1$) from the BPF processed sprung displacement $z_2$, thereby computing the unsprung displacement $z_1\_b$.

Notably, due to the BPF process of step 1303 and the BPF process of step 1304, the unsprung displacement $z_1\_b$ computed in step 1305 has a phase shift.

Step 1306: The CPU3 determines the position (passage position) of the wheel 11 by referring to the present position of the vehicle 10, the heading direction Td of the vehicle 10, and the positional relationship data as described above. Subsequently, the CPU3 relates the position of the wheel 11 to the unsprung displacement $z_1\_b$ computed in step 1305.

Step 1307: The CPU3 transmits the combination of the position of the wheel 11 and the unsprung displacement $z_1\_b$ to the server 41 via the radio communication device 33.

Every time a predetermined time elapses, the CPU2 of the server 41 receives the combination of the position of the wheel 11 and the unsprung displacement $z_1\_b$ from the ECU 130. The CPU2 stores the combination of the position of the wheel 11 and the unsprung displacement $z_1\_b$ in the storage device 42 as the second data 44.

As described above, the unsprung displacement $z_1\_b$ is obtained through BPF processes (step 1303 and step 1304) which produce phase shifts. Meanwhile, as having been described in relation to the routine of FIG. 9, the unsprung displacement $z_1\_c$ is also obtained through BPF processes (step 903 and step 904) which produce phase shifts. Although both the unsprung displacement $z_1\_b$ and the unsprung displacement $z_1\_c$ have phase shifts, since the unsprung displacement $z_1\_b$ and the unsprung displacement $z_1\_c$ are obtained through the same BPF processes, the degree of phase shift of the unsprung displacement $z_1\_b$ and the degree of phase shift of the unsprung displacement $z_1\_c$ coincide with each other. Namely, the phase of the unsprung displacement $z_1\_b$ and the phase of the unsprung displacement $z_1\_c$ coincide with each other. Accordingly, the vibration damping control apparatus 20 can compute the value Dz1 by using the unsprung displacement $z_1\_b$ and the unsprung displacement $z_1\_c$ whose phases coincide with each other. Therefore, the vibration damping control apparatus 20 can accurately determine whether or not the road surface condition has changed greatly after the past point in time when the measurement data 42*a* was created.

The present disclosure is not limited to the above-described embodiment, and various modifications can be employed within the range of the present disclosure.
(First Modification)

The second data 44 is not limited to the above-described example. In one or more embodiments, the unsprung displacement $z_1\_b$ may be managed accordance to the speed Vs or the speed range (speed zone) containing the speed Vs. As shown in FIG. 14, the second data 44 may be data in which the second position information 45*a*, the speed information 45*b*, and the second road surface displacement related value (the unsprung displacement $z_1\_b$) 45*c* are related to one another. The second position information 45*a* represents the position of a wheel of the measurement vehicle when the unsprung displacement $z_1\_b$ was obtained. The speed information 45*b* represents the speed of the measurement vehicle when the unsprung displacement $z_1\_b$ was obtained.

In this configuration, in step 907 of the routine of FIG. 9, the CPU1 of the ECU 30 obtains, from the second data 45, the unsprung displacement $z_1\_b$ related to the speed information 45*b* corresponding to the speed Vs of the vehicle 10 at the present point in time.

The frequency band (hereinafter referred to as the "first frequency band") of vibrations generated in the measurement vehicle when the measurement vehicle traveled on a certain road at a speed Vsa differs from the frequency band (hereinafter referred to as the "second frequency band") of vibrations generated in the measurement vehicle when the measurement vehicle traveled on the same road at a speed Vsb. Namely, the frequency band of vibrations represented by the road surface displacement related value obtained when the measurement vehicle traveled at the speed Vsa is the first frequency band, and the frequency band of vibrations represented by the road surface displacement related value obtained when the measurement vehicle traveled at the speed Vsb is the second frequency band. Here, it is assumed that the speed Vsb is higher than the speed Vsa, and the difference between the speed Vsb and the speed Vsa is relatively large. It is assumed that the first frequency band ranges from a frequency fa_low to a frequency fa_high (>fa_low), and the second frequency band ranges from a frequency fb_low to a frequency fb_high (>fb_low). In general, the frequency fb_high is lower than the frequency fa_high, and the frequency fb_low is lower than the frequency fa_low. Accordingly, the first frequency band contains a frequency band which is not contained in the second frequency band (for example, a frequency band from the frequency fb_high to the frequency fa_high). Furthermore, the larger the difference between the speed Vsb and the speed Vsa, the larger the difference between the frequency fb_high and the frequency fa_high.

For example, it is assumed that, in a situation where the vehicle is traveling at the speed Vsb, the vibration damping control apparatus computes the value Dz1 by using the road surface displacement related value (the unsprung displacement $z_1\_b$) obtained when the measurement vehicle traveled at the speed Vsa. In this case, the frequency band of the vibration represented by a time series change of the unsprung displacement $z_1\_b$ is the first frequency band. Meanwhile, the frequency band of the vibration represented by a time series change of the unsprung displacement $z_1\_c$ is the second frequency band. Although vibrations in the frequency band ranging from fb_high to fa_high are not generated in the vehicle 10, the CPU1 computes the value Dz1 by using the unsprung displacement $z_1\_b$ containing a vibration(s) in the frequency band ranging from fb_high to fa_high. Accordingly, there is the possibility that, despite that the road surface condition has not changed after creation of the measurement data 42*a*, the value Dz1 becomes large temporarily, and the first condition is satisfied. In the case where the first condition is satisfied, since the particular control is executed, the magnitudes of the target control forces Fct_f and Fct_r become smaller. As a result, the vibration damping control apparatus 20 fails to suppress the vibration(s) in the second frequency band. Accordingly, there is the possibility that the vibration of the sprung portion 51 increases. In the present example, the CPU1 can obtain the unsprung displacement $z_1\_b$ suitable for the speed Vs from the second data 44. Accordingly, it is possible to accurately determine, through estimation, whether or not the road surface condition has changed after creation of the measurement data 42*a*.
(Second Modification)

The steps 903 and 904 of the routine of FIG. 9 and the steps 1303 and 1304 of the routine of FIG. 13 may be omitted. Namely, the unsprung displacement $z_1\_b$ may be computed without performing BPF processes, and the unsprung displacement $z_1\_c$ may be computed without performing BPF processes. Even when this configuration is employed, the phase of the unsprung displacement $z_1\_b$ and the phase of the unsprung displacement $z_1\_c$ coincide with each other. The ECU 30 can compute the value Dz1 by using the unsprung displacement $z_1\_b$ and the unsprung displacement $z_1\_c$ whose phases coincide with each other.

In one or more embodiments, only the steps 1303 and 1304 of the routine of FIG. 13 may be omitted. In this case, the ECU 30 may be configured to execute the same BPF process as in step 903 on the second data 44 received from the server 41 and store the second data 44 containing the BPF-processed unsprung displacement ($z_1\_b$) 44*a* in the RAM 30*c*. In a different example, the server 41 may be configured to execute the same BPF process as in step 1303 on data of the unsprung displacement ($z_1\_b$) 44*a* before sending the second data 44 to the vibration damping control apparatus 20 (the ECU 30).
(Third Modification)

In one or more embodiments, the measurement data 42*a* may contain the first data 43 only. The ECU 30 may execute the same BPF process as in step 903 on the first data 43 received from the server 41. As a result, the unsprung displacement ($z_1\_a$) 43*a* has a phase shift. The ECU 30 may handle the unsprung displacement ($z_1\_a$) 43*a* having a phase shift as the unsprung displacement $z_1\_b$. The CPU1 can compute the value Dz1 by using the unsprung displacement $z_1\_a$ and the unsprung displacement $z_1\_c$ whose phases coincide with each other. In a different example, the server 41 may execute the same BPF process as in step 1303 on data of the unsprung displacement ($z_1\_a$) 43a of the first data 43. As a result, the unsprung displacement ($z_1\_a$) 43a has a phase shift. The server 41 may transmit the unsprung displacement $z_1\_a$ having a phase shift to the ECU 30 as the unsprung displacement $z_1\_b$.

(Fourth Modification)

In step 806 of the routine of FIG. 8, the CPU1 may set the gain pf of expression (10) and the gain βr' of expression (11) to "0." In this case, the preview vibration damping control is not executed substantially. It is possible to reduce the possibility that the vibration of the sprung portion 51 increases.

(Fifth Modification)

The expression for calculating the target control force Fct is not limited to the above-described example. In each of step 805 and step 806, the CPU1 may compute the target control force Fct in accordance with the following expression (12), where each of $G_1$ and $G_2$ is a gain. F1 is the same as in expression (7) and will be referred to as the "first target control force F1" in the following description. The CPU1 computes the first target control force F1 by applying the unsprung displacement $z_1\_a$ obtained from the first data 43 to expression (13).

$$Fct=G_1 \cdot F1+G_2 \cdot F2 \quad (12)$$

$$F1=\beta_2 \times z_1 \quad (13)$$

F2 includes target control force for feedforward control and/or target control force for feedback control and will be referred to as the "second target control force F2" in the following description. The second target control force F2 includes at least one of $F2\_a$ of expression (14), $F2\_b$ of expression (15), and $F2\_c$ of expression (16). $F2\_a$ is the target control force for feedforward control and computed by using the road surface displacement $z_0$ ahead of the vehicle 10 which was obtained by the preview sensor 36. $\beta_3$ is a gain. $F2\_b$ is the target control force for feedback control for damping the vibration of the sprung portion 51. $F2\_b$ is determined to make $dz_2$ zero. $F2\_c$ is the target control force for feedforward control of the rear wheel 11R. $F2\_c$ is computed by applying to expression (16) the unsprung displacement $z_1\_c$ at the passage position of the front wheel 11F, which is obtained in the routine of FIG. 9. $\beta_4$ is a gain.

$$F2\_a=\beta_3 \times z_0 \quad (14)$$

$$F2\_b=\gamma_0 \cdot dz_2 \quad (15)$$

$$F2\_c=\beta_4 \times z_1 \quad (16)$$

Accordingly, in the case of the front wheel 11F, the second target control force F2 may be one of $F2\_a$ of expression (14) and $F2\_b$ of expression (15), or the sum of $F2\_a$ and $F2\_b$. In the case of the rear wheel 11R, the second target control force F2 may be one of $F2\_a$ of expression (14), $F2\_b$ of expression (15), and $F2\_c$ of expression (16), or the sum of two or more of $F2\_a$, $F2\_b$, and $F2\_c$.

In a certain example, in the case where the first condition is satisfied (step 806), the CPU1 may set the gain $G_1$ (namely, the weight for the first target control force F1) to become smaller as compared with the case where the first condition is not satisfied (step 805). It is possible to suppress vibrations by the component of the second target control force F2 in the target control force Fct, while reducing the component of the first target control force F1 in the target control force Fct. Notably, in step 806, the CPU1 may set the gain $G_1$ to zero.

Furthermore, in the case where the first condition is satisfied (step 806), the CPU1 may set the gain $G_2$ (namely, the weight for the second target control force F2) to become larger as compared with the case where the first condition is not satisfied (step 805). It is possible to enhance the effect of suppressing vibrations by increasing the component of the second target control force F2 in the target control force Fct.

Notably, the expression used for computing $F2\_b$ for feedback control is not limited to expression (15) and may be an expression which includes at least one of the term of the sprung displacement $z_2$, the term of the sprung speed $dz_2$, the term of the sprung acceleration $ddz_2$, the term of the unsprung displacement $z_1$, and the term of the unsprung speed $dz_1$. For example, the CPU1 may compute $F2\_b$ in accordance with the following expression (17), where each of $\gamma_1$, $\gamma_2$, $\gamma_3$, $\gamma_4$, and $\gamma_5$ is a gain.

$$F2\_b=\gamma_1 \times ddz_2+\gamma_2 \times dz_2+\gamma_3 \times z_2+\gamma_4 \times dz_1+\gamma_5 \times z_1 \quad (17)$$

(Sixth Modification)

The CPU2 of the server 41 may compute the unsprung displacement $z_1\_b$. The CPU2 receives, in real time, the sprung acceleration $ddz_2$, the stroke H, and the position of the wheel from the measurement vehicle (the vehicle 10). The CPU2 may create the second data 44 by executing steps 1302 to 1305 of the routine of FIG. 13.

(Seventh Modification)

The CPU1 may compute the value Dz1 for one or more of the left front wheel 11FL, the right front wheel 11FR, the left rear wheel 11RL, and the right rear wheel 11RR. In the case where the CPU1 computes the value Dz1 for two or more wheels 11, the CPU1 may determine that the first condition is satisfied when the average of Dz1 is equal to or greater than the first threshold Th1.

(Eighth Modification)

The first condition is not limited to the above-descried example, so long as the first condition enables the determination as to whether or not the road surface condition has changed after creation of the measurement data 42a. For example, the first condition may be a condition regarding the unsprung speed $dz_1$. For example, the CPU1 of the ECU 30 computes the unsprung speed $dz_1\_c$ in step 905 of the routine of FIG. 9. In step 907, the CPU1 obtains the unsprung speed $dz_1\_b$ at the passage position from the second data 44. Subsequently, in step 908, the CPU1 may compute the magnitude (absolute value) $Dz2(=|dz_1\_c-dz_1\_b|)$ of the difference between the unsprung speed $dz_1\_c$ and the unsprung speed $dz_1\_b$. In this case, the first condition may be a condition which is satisfied when the value Dz2 is equal to or greater than a first unsprung speed threshold Thv1. The second condition may be a condition which is satisfied when the value Dz2 is equal to or less than a second unsprung speed threshold Thv2. The second unsprung speed threshold Thv2 is a value equal to or less than the first unsprung speed threshold Thv1. Notably, the first condition may be a condition regarding the road surface displacement $z_0$ or the road surface displacement speed $dz_0$. The first condition may be a condition set by using at least one of the unsprung displacement $z_1$, the unsprung speed $dz_1$, the road surface displacement $z_0$, and the road surface displacement speed $dz_0$.

In a different example, the CPU1 may determine the satisfaction of the first condition and the satisfaction of the second condition on the basis of a time series change of the value Dz1. For example, the CPU1 temporarily stores the value Dz1 in the RAM 30c. Every time the vehicle 10 travels over a predetermined distance, the CPU1 may compute a moving average from the plurality of stored values Dz1. The first condition and/or the second condition may be a condition regarding the moving average of the value Dz1. For example, when the moving average of the value Dz1 becomes equal to or greater than the first threshold Th1, the CPU1 may determine that the first condition is satisfied. When the moving average of the value Dz1 becomes equal to or less than the second threshold Th2, the CPU1 may determine that the second condition is satisfied. In another example, the CPU1 may execute a low-pass filter process on the basis of the value Dz1 stored in the RAM 30c in such a manner that a waveform representing the time series change of the value Dz1 is subjected to low-pass filtering. As a result, the moving average of the value Dz1 can be obtained substantially. The first condition and/or the second condition may be a condition regarding the maximum value or the minimum value of a waveform obtained by executing the above-described low-pass filter process. Accordingly, the CPU1 may determine the satisfaction of the first condition and the satisfaction of the second condition on the basis of at least one of the value Dz1 and the time series change of the value Dz1. Similarly, the CPU1 may determine the satisfaction of the first condition and the satisfaction of the second condition on the basis of at least one of the value Dz2 and the time series change of the value Dz2.

(Ninth Modification)

The CPU2 of the server 41 may execute a process of estimating either or both of the unsprung displacement $z_{1\_}a$ and the unsprung speed $dz_{1\_}a$ by using an observer. The CPU2 may produce the time series data of the road surface displacement $z_0$ by executing a zero-phase filter process on the time series data of the road surface displacement $z_0$ detected by the preview sensor 36 as described above. Furthermore, the CPU2 may produce the time series data of the road surface displacement speed $dz_0$ by executing a differential process and a zero-phase filter process on the time series data of the road surface displacement $z_0$. Accordingly, the CPU2 may store at least one of the road surface displacement $z_0$, the road surface displacement speed $dz_0$, the unsprung displacement $z_1$, and the unsprung speed $dz_1$ in the storage device 42 as the first road surface displacement related value 43a of the first data 43.

The CPU3 of the ECU 130 may execute a process of estimating either or both of the unsprung displacement $z_1$ and the unsprung speed $dz_1$ by using an observer. The CPU3 may obtain the road surface displacement $z_0$ detected by the preview sensor 36. Furthermore, the CPU3 may compute the road surface displacement speed $dz_0$ by executing a differential process on the road surface displacement $z_0$. The CPU3 may transmit the road surface displacement $z_0$, the road surface displacement speed $dz_0$, the unsprung displacement $z_1$, and the unsprung speed $dz_1$ to the server 41. The sever 41 may store at least one of the road surface displacement $z_0$, the road surface displacement speed $dz_0$, the unsprung displacement $z_1$, and the unsprung speed $dz_1$ in the storage device 42 as the second road surface displacement related value 44a of the second data 44.

(Tenth Modification)

The first data 43 and the second data 44 may be stored in the storage device 37 of the vehicle 10 instead of being stored in the storage device 42 of the cloud 40. The ECU 130 may have the function of the server 41. The ECU 130 may create the first data 43 in the storage device 37 by executing the process of the routine of FIG. 12. The ECU 130 may create the second data 44 in the storage device 37. The ECU 130 may receive the first data 43 and the second data 44 from other measurement vehicles and store the first data 43 and the second data 44 in the storage device 37.

(Eleventh Modification)

The suspensions 13FL to 13RR may be suspensions of any type so long as the suspensions allow vertical displacements of the wheels 11FL to 11RR in relation to the body 10a. Furthermore, the suspension springs 16FL to 16RR may be springs of any type such as compression coil springs, air springs, etc.

(Twelfth Modification)

In the above-described embodiment, the active actuator 17 is used as a control force generating apparatus. However, the control force generating apparatus is not limited thereto. Namely, the control force generating apparatus may be any actuator which can adjustably generate a control force in the vertical direction for damping the vibration of the sprung portion 51, on the basis of a control instruction containing the target control force.

Furthermore, the control force generating apparatus may be an active stabilizer apparatus (not shown). The active stabilizer apparatus includes a front wheel active stabilizer and a rear wheel active stabilizer. When the front wheel active stabilizer generates a control force (left front wheel control force) in the vertical direction between the sprung portion 51 and the unsprung portion 50 which correspond to the left front wheel 11FL, the front wheel active stabilizer generates a control force (right front wheel control force) in the direction opposite the left front wheel control force between the sprung portion 51 and the unsprung portion 50 which correspond to the right front wheel 11FR. Similarly, when the rear wheel active stabilizer generates a control force (left rear wheel control force) in the vertical direction between the sprung portion 51 and the unsprung portion 50 which correspond to the left rear wheel 11RL, the rear wheel active stabilizer generates a control force (right rear wheel control force) in the direction opposite the left rear wheel control force between the sprung portion 51 and the unsprung portion 50 which correspond to the right rear wheel 11RR. The structure of the above-described active stabilizer apparatus is well known and is incorporated into the specification of the present application by referring to Japanese Patent Application Laid-Open (kokai) No. 2009-96366. Notably, it is sufficient that the active stabilizer apparatus includes at least one of the front wheel active stabilizer and the rear wheel active stabilizer.

The control force generating apparatus may be an apparatus which generates the control force Fc in the vertical direction by utilizing the geometry of the suspensions 13FL to 13RR; specifically, by increasing and decreasing braking and driving forces applied to the wheels 11 of the vehicle 10. The structure of such an apparatus is well known and is incorporated into the specification of the present application by referring to Japanese Patent Application Laid-Open (kokai) No. 2016-107778, etc. The ECU 30 computes the braking and driving forces for generating the control force Fc corresponding to the target control force Fct by a well known method.

Such an apparatus includes a drive apparatus (for example, in-wheel motors) for applying drive forces to the wheels 11 and a braking apparatus for applying braking forces to the wheels 11. Notably, the drive apparatus may be a motor, an engine, or the like which applies drive forces to the front wheels, the rear wheels, or the four wheels. Furthermore, it is sufficient that the control force generating apparatus includes at least one of the drive apparatus and the braking apparatus.

Alternatively, the control force generating apparatus may be damping-force-variable type shock absorbers 15FL to 15RR. In this case, the ECU 30 controls the damping coefficients C of the shock absorbers 15FL to 15RR in such a manner that the damping forces of the shock absorbers 15FL to 15RR change by an amount corresponding to the target control force Fct.

What is claimed is:

1. A vibration damping control apparatus for a vehicle, comprising:
   a control force generating apparatus configured to generate control force in a vertical direction for damping vibration of a sprung portion of the vehicle, the control force being applied between at least one wheel and a portion of a body of the vehicle, which portion corresponds to a position of the wheel;
   a control unit which obtains measurement data in which a road surface displacement related value obtained when a measurement vehicle traveled on a road surface and relating to displacement of the road surface in the vertical direction is related to position information representing a position where the road surface displacement related value was obtained, the control unit determining a predicted passage position that the wheel is predicted to pass after elapse of a predetermined time from the present point in time, obtaining, as preview information, the road surface displacement related value at the predicted passage position on the basis of the measurement data, and executing preview vibration damping control for controlling the control force generating apparatus in such a manner that, at a point in time when the wheel passes the predicted passage position, the control force coincides with a final target control force including a first target control force computed by using the preview information; and
   an information obtaining apparatus configured to obtain the road surface displacement related value while the vehicle is traveling, wherein
   the control unit is configured
   to obtain, from the information obtaining apparatus, as a first value, the road surface displacement related value at a passage position that the wheel of the vehicle has passed at the present point in time,
   to obtain, as a second value, the road surface displacement related value at the passage position on the basis of the measurement data,
   to determine whether or not a first condition is satisfied by using the first value and the second value, the first condition being satisfied when a probability that a road surface condition at the passage position has changed after creation of the measurement data is high, and
   to execute a particular control, when the control unit determines that the first condition is satisfied, so as to set the magnitude of the first target control force to be smaller as compared with the case where the first condition is not satisfied.

2. A vibration damping control apparatus according to claim 1, wherein the control unit is configured to determine whether or not the first condition is satisfied on the basis of at least one of a difference between the first value and the second value and a time series change of the difference.

3. A vibration damping control apparatus according to claim 1, wherein the control unit is configured
   to determine, after having started the particular control, whether or not a second condition is satisfied by using the first value and the second value, the second condition being satisfied when a probability that the road surface condition at the passage position has not changed after creation of the measurement data is high, and
   to end the particular control when the second condition is satisfied.

4. A vibration damping control apparatus according to claim 3, wherein the control unit is configured to determine whether or not the second condition is satisfied on the basis of at least one of a difference between the first value and the second value and a time series change of the difference.

5. A vibration damping control apparatus according to claim 1, wherein the measurement data includes first data in which the road surface displacement related value used as the preview information is related to the position information, and second data in which the road surface displacement related value used as the second value is related to the position information.

6. A vibration damping control apparatus according to claim 5, wherein the road surface displacement related value of the second data is a value computed through a filter process which allows passage of only components in a particular frequency band, and
   wherein the control unit is configured to execute the filter process on the first value.

7. A vibration damping control apparatus according to claim 5, wherein, in the second data, speed information representing speed of the measurement vehicle or a speed range in which the speed of the measurement vehicle is contained is further related to the road surface displacement related value and the position information, and
   wherein the control unit is configured to obtain, from the second data, as the second value, the road surface displacement related value related to the speed information corresponding to the speed of the vehicle.

8. A vibration damping control apparatus according to claim 1, wherein the final target control force further includes a second target control force, and the second target control force includes at least one of feedback control force for damping vibration of the sprung portion and control force computed by using the road surface displacement related value obtained by the information obtaining apparatus and representing displacement of the road surface ahead of the wheel of the vehicle, and
   wherein the control unit is configured to set the magnitude of the second target control force in the particular control such that the magnitude of the second target control force becomes larger as compared with the case where the first condition is not satisfied.

9. A vibration damping control apparatus according to claim 1, wherein the road surface displacement related value includes at least one of road surface displacement representing displacement of the road surface in the vertical direction, road surface displacement speed representing a derivative value of the road surface displacement with respect to time, unsprung displacement representing displacement of an unsprung portion of the vehicle in the vertical direction, and unsprung speed representing a derivative value of the unsprung displacement with respect to time.

* * * * *